US008476569B2

(12) United States Patent
Konno et al.

(10) Patent No.: US 8,476,569 B2
(45) Date of Patent: Jul. 2, 2013

(54) IMAGE PROJECTION DEVICE HAVING A DEFLECTION SECTION WITH A DEFLECTION CONTROL SECTION FOR DISTORTION CORRECTION AND SPEED CORRECTION

(75) Inventors: Kenji Konno, Sakai (JP); Kenji Mizumoto, Osaka (JP)

(73) Assignee: Konica Minolta Opto, Inc., Tokyo (JP)

( * ) Notice: Subject to any disclaimer, the term of this patent is extended or adjusted under 35 U.S.C. 154(b) by 313 days.

(21) Appl. No.: 13/059,200

(22) PCT Filed: Jul. 15, 2009

(86) PCT No.: PCT/JP2009/062777
§ 371 (c)(1),
(2), (4) Date: Feb. 15, 2011

(87) PCT Pub. No.: WO2010/021215
PCT Pub. Date: Feb. 25, 2010

(65) Prior Publication Data
US 2011/0141441 A1 Jun. 16, 2011

(30) Foreign Application Priority Data
Aug. 18, 2008 (JP) .................................. 2008-209883

(51) Int. Cl.
*H01L 27/00* (2006.01)
(52) U.S. Cl.
USPC ........................................ 250/208.1; 353/37
(58) Field of Classification Search
USPC .................. 250/208.1, 216, 234–236; 353/37, 353/69, 70, 50; 348/745–750, 203–205, 195, 348/196
See application file for complete search history.

(56) References Cited

U.S. PATENT DOCUMENTS 5,614,961 A * 3/1997 Gibeau et al. ................. 348/750
6,590,606 B1   7/2003 Hiller et al.
(Continued)

FOREIGN PATENT DOCUMENTS

EP 0 615 721   9/1994
EP 1 674 914 A1   6/2006
(Continued)

OTHER PUBLICATIONS

Extended Search Report issued on Jul. 27, 2012 in the corresponding European Patent Application No. 09 80 8151.

(Continued)

*Primary Examiner* — Que T Le
(74) *Attorney, Agent, or Firm* — Cozen O'Connor

(57) ABSTRACT

An object is to provide a image projection device which has a small size but can project an image having a high image quality. To achieve the object, in an image projection device, a reflection part which reflects a light flux from a light source is, while being rotated around a first axis by non-resonance driving, rotated by resonance driving around a second axis which is substantially perpendicular to the first axis, and thereby the light flux is deflected in a two-dimensional direction. By controlling the rotation of the reflection part, a correction for suppressing an image distortion along one scanning direction on a projection surface, and a correction for keeping substantially constant a scanning speed of the light flux along the other scanning direction on the projection surface, are performed. Here, the relationship of 10°<θ<70° is satisfied, where θ represents an angle of inclination of the light flux, which is projected to the projection surface, toward the other scanning direction relative to a normal line of the projection surface, in a case where the reflection part is in a central position of the rotations around the first and second axes.

12 Claims, 18 Drawing Sheets

U.S. PATENT DOCUMENTS

| | | | |
|---|---|---|---|
| 2006/0139718 A1 | 6/2006 | Ishihara | 359/205 |
| 2007/0171497 A1 | 7/2007 | Ishihara et al. | 359/202 |
| 2008/0143979 A1 | 6/2008 | Konno | 359/98 |
| 2008/0158524 A1 | 7/2008 | Konno et al. | 353/99 |
| 2008/0158525 A1 | 7/2008 | Fujiyo et al. | 353/99 |

FOREIGN PATENT DOCUMENTS

| | | |
|---|---|---|
| JP | 2002-328428 A | 11/2002 |
| JP | 2006-178346 A | 7/2006 |
| JP | 2007-199251 A | 8/2007 |
| JP | 2008-151887 A | 7/2008 |
| JP | 2008-164955 A | 7/2008 |
| JP | 2008-164957 A | 7/2008 |
| WO | WO 2005/067314 | 7/2005 |
| WO | WO 2010/021215 A1 | 2/2010 |

OTHER PUBLICATIONS

Stem, Miklos, et al., "73.3: Ultra-Miniature Projector: A High Resolution, Battery Powered Laser Display", SID 06 Digest, pp. 2015-2017.

* cited by examiner

FIG. 6A
|  | UNIFORMITY OF SPEED | DISTORTION |
|---|---|---|
| HORIZONTAL SCANNING | — | TRAPEZOIDAL DISTORTION |
| VERTICAL SCANNING | NON-UNIFORM INTERVALS OF HORIZONTAL LINES | — |
FIG. 6B
|  | UNIFORMITY OF SPEED | DISTORTION |
|---|---|---|
| HORIZONTAL SCANNING | IMAGE CORRECTION | DEFLECTION/SCANNING DRIVING CORRECTION |
| VERTICAL SCANNING | DEFLECTION/SCANNING DRIVING CORRECTION | IMAGE CORRECTION |
FIG. 7A
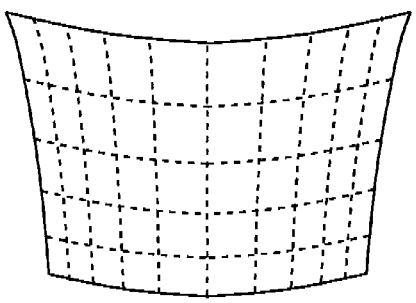
FIG. 7B
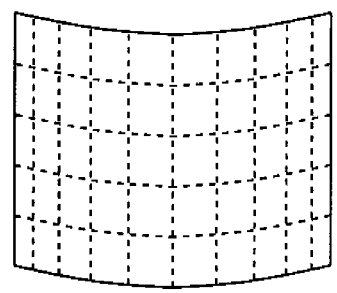
FIG. 7C
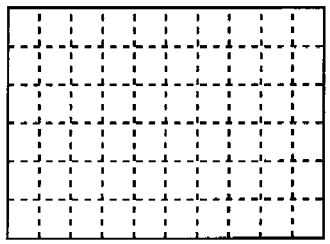

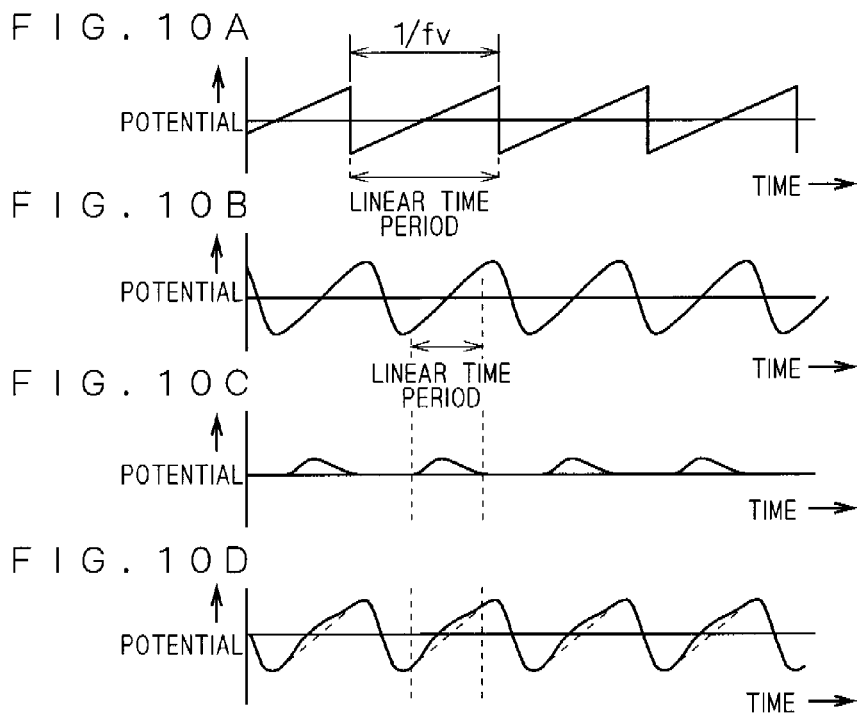
FIG. 10A
FIG. 10B
FIG. 10C
FIG. 10D
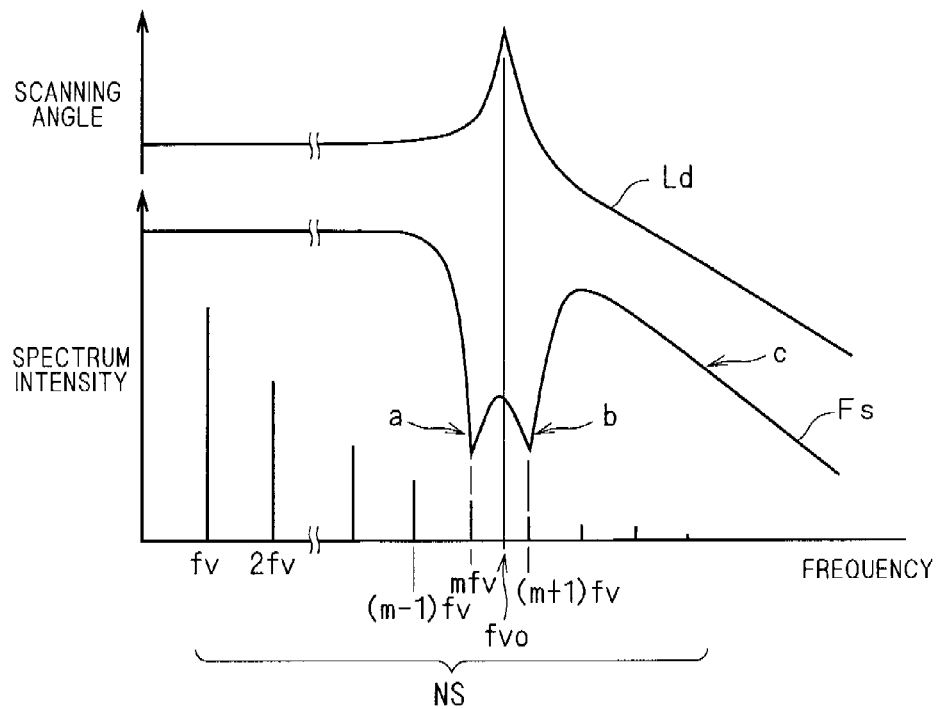
FIG. 11

F I G . 1 5
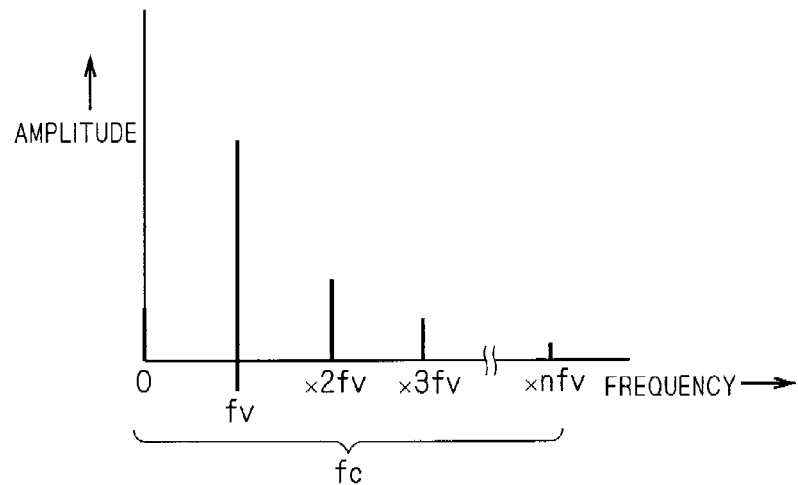
F I G . 1 6
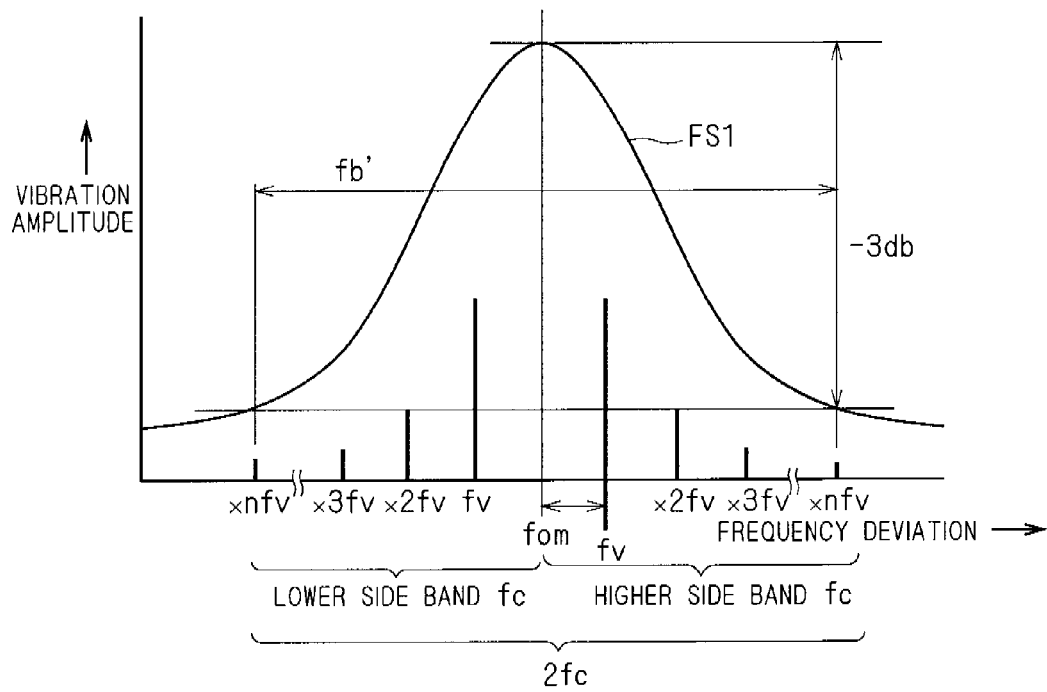

F I G . 1 7

| θ | Xs/Xm ( =Rs/Rm ) |
|---|---|
| 5 | 1.02 |
| 10 | 1.06 |
| 12.5 | 1.10 |
| 15 | 1.15 |
| 20 | 1.31 |
| 25 | 1.56 |
| 30 | 2.00 |
| 35 | 2.92 |

|  | UNIFORMITY OF SPEED | DISTORTION |
|---|---|---|
| HORIZONTAL SCANNING | IMAGE CORRECTION | DEFLECTION/SCANNING DRIVING CORRECTION + OPTICAL CORRECTION |
| VERTICAL SCANNING | DEFLECTION/SCANNING DRIVING CORRECTION | OPTICAL CORRECTION |

F I G. 2 4 A
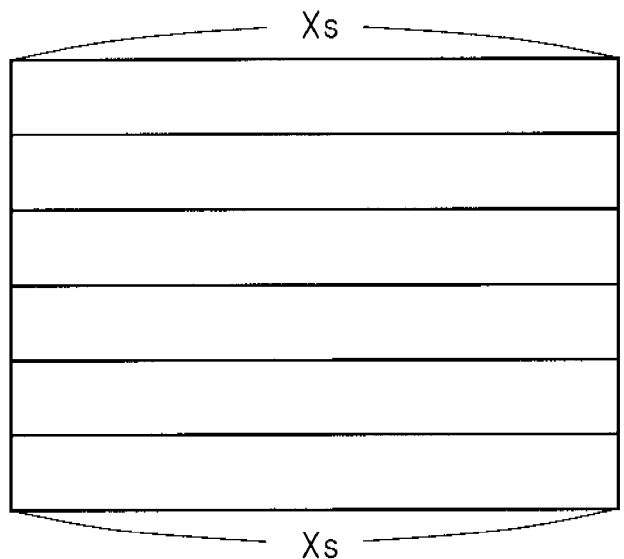
F I G. 2 4 B
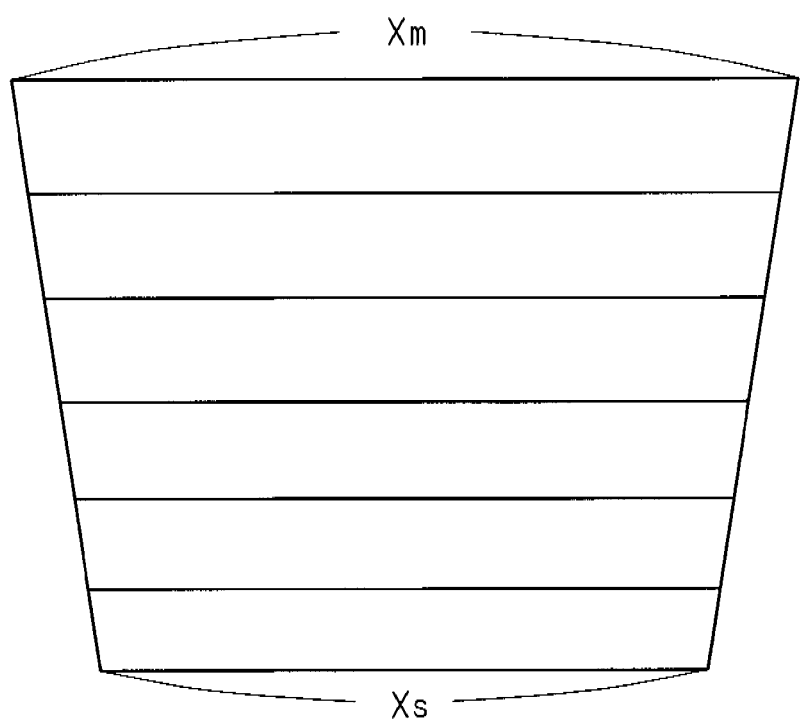

IMAGE PROJECTION DEVICE HAVING A DEFLECTION SECTION WITH A DEFLECTION CONTROL SECTION FOR DISTORTION CORRECTION AND SPEED CORRECTION

RELATED APPLICATIONS

This is a U.S. National Stage under 35 U.S.C. §371 of International Application No. PCT/JP2009/062777, filed in the Japanese Patent Office on Jul. 15, 2009, and claims priority on Japanese Patent Application No. 2008-209883, filed on Aug. 18, 2008.

TECHNICAL FIELD

The present invention relates to an image projection device which projects an image to a projection surface. In more detail, the present invention relates to a small-size image projection device which two-dimensionally deflects and scans a light to project an image, and particularly to an optical system thereof. In further detail, the present invention relates to a small-size, so-called optical engine part of a pocket projector, a data projector, a rear-projection TV, or the like.

BACKGROUND ART

Various small-size image projection devices have been proposed which two-dimensionally deflect and scan a light from a light source and project an image (for example, Patent Documents 1, 2, and Non-Patent Document 1). As means (optical scanning means) for two-dimensionally deflecting a light, a galvanometer mirror or a so-called MEMS (Micro Electro Mechanical Systems) mirror is used.

Such a small-size image projection device is characterized in that the device itself is small. Therefore, a projection can be performed with the device itself being held in a hand. However, holding the device in a hand for a long time is not preferable because it causes fatigue. Therefore, it is conceivable that the device is installed on a desk or a floor to perform a projection. In such a case, however, if the projection is performed simply toward the front side, a part of a projected image is projected onto the desk or the floor, thus causing a void (vignetting) of the projected image. Thus, a projection method (so-called oblique projection method) is adopted in which a light is incident obliquely with respect to the center of a screen (projection surface) to which an image is projected. However, in a case of a deflection/scanning device having no optical system (projection optical system) which projects a deflected light to a projection surface, a defect (trapezoidal distortion) is caused in which an image (projected image) on the projection surface is distorted into a trapezoidal shape. Along with the distortion, non-uniformity of a scanning angle occurs between an upper portion and a lower portion of the screen, and thus non-uniformity of the resolution on the screen also occurs. Therefore, a high-quality image cannot be projected.

In such an image projection device, to project a moving image to a large screen, it is necessary to drive a galvanometer mirror or a MEMS mirror at a high speed and with a large amplitude (mechanical deflection angle), and for example, a driving method using a resonance (resonance driving) is adopted. However, it is known that in a case where the resonance driving is adopted, a scanning speed largely drops at both ends of the amplitude which mean the maximum value and the minimum value of the amplitude, in other words, near the vicinity of an image. Due to this phenomenon, a circumferential portion of the screen is relatively brighter than the center of the screen, and in a case where a modulation rate of a light source is constant, a difference of the resolution occurs between the center of the screen and the circumferential portion of the screen. They are known as typical problems.

Against these problems, for example, it is conceivable to realize a correction of an image distortion and a uniform speed of a light flux radiated to a projection surface such as the screen, by using a projection optical system. For example, there has been proposed an optical scanning device which performs correction of a uniform speed of scanning and an image distortion by giving so-called f-arcsine characteristics to a projection optical system and using a projection optical system including a combination of two mirrors and a single refractive lens or a combination of three mirrors (for example, Patent Document 1). There have been also proposed a projector and an image projection system in which distortion detection means is provided to control the rotation of a deflecting mirror (for example, Patent Document 2). Moreover, there has been proposed a technique of performing correction of a uniform speed of scanning and an image distortion by utilizing an image processing (for example, Non-Patent Document 1).

PRIOR-ART DOCUMENTS

Patent Documents

Patent Document 1: Japanese Patent Application Laid-Open No. 2006-178346
Patent Document 2: Japanese Patent Application Laid-Open No. 2002-328428

Non-Patent Documents

Non-Patent Document 1: SID 06 DIGEST, P2015-2017, 73.3

SUMMARY OF THE INVENTION

Problems to be Solved by the Invention

Here, according to the technique of the aforementioned Patent Document 1, in a device using a MEMS mirror which two-dimensionally deflects and scans a light, the speed of scanning is uniformized and a distortion of a projected image is corrected. However, all defects caused by a driving method of the MEMS mirror and a projection method are corrected by the shape of an optical system (projection optical system) which projects a light deflected by the MEMS mirror to a projection surface. This leads to an increase in the size of the projection optical system and thus an increase in the size of an image projection device. In a case where a resonance driving in a direction (lateral direction) along a horizontal scanning line and a linear driving in a longitudinal direction are corrected by the projection optical system alone using the MEMS mirror, the projection optical system is complicated to lead to the increase in the size of the projection optical system. Thus, it can be said that in spite of an original aim at downsizing, the size of the device is increased and the need is not properly met.

According to the technique of the aforementioned Patent Document 2, an image distortion can be corrected by controlling a light deflection performed by a deflecting mirror. However, there is no mention to the things other than the distortion, that is, a uniform speed of a light flux and a correction of a non-uniformity of the resolution in a screen. Thus, it is difficult to obtain a projected image having a high image quality.

Additionally, in a case where the defects caused by the driving method of the MEMS mirror and the projection method are corrected by using the image processing as in the technique of the Non-Patent Document 1, an angle used for deflection and projection of a light is reduced among a mechanical deflection angle of the MEMS mirror. Therefore, a so-called duty reduction causes a reduction of an image brightness, that is, a deterioration of an image quality.

The present invention has been accomplished in view of the problems mentioned above, and an object of the present invention is to provide an image projection device having a small size and capable of projecting an image having a high image quality.

Means for Solving the Problems

To solve the above-mentioned problems, an image projection device according to a first aspect is an image projection device which projects an image to a projection surface, the image projection device including: a light source section; a deflection section having a reflection part which reflects a light flux emitted from the light source section, and deflecting the light flux in a two-dimensional direction by rotation of the reflection part around a first axis and rotation of the reflection part around a second axis which is substantially perpendicular to the first axis; and a deflection control section which makes a control for rotating the reflection part around the second axis by resonance driving, and rotating the reflection part around the first axis by non-resonance driving. In the image projection device: the deflection control section controls the rotation of the reflection part around the second axis to thereby perform a distortion correction in one direction for suppressing an image distortion along one scanning direction on the projection surface, and controls the rotation of the reflection part around the first axis to thereby perform a speed correction in the other scanning direction for keeping substantially constant a scanning speed of the light flux along the other scanning direction which is substantially perpendicular to the one scanning direction on the projection surface; and the relationship of $10°<\theta<70°$ is satisfied, where $\theta$ represents an angle of inclination of the light flux, which is projected to the projection surface, toward the other scanning direction, relative to a normal line of the projection surface, in a case where the reflection part is in a central position of the rotations around the first and second axes.

An image projection device according to a second aspect is the image projection device according to the first aspect, and further includes a projection optical system which projects the image to the projection surface by guiding the light flux deflected by the deflection section onto the projection surface. In the image projection device: an optical surface forming the projection optical system has a shape for performing a distortion correction in the other scanning direction for suppressing an image distortion along the other scanning direction on the projection surface, and the distortion correction in one scanning direction; the relationship of $0<\Delta H<0.2$ is satisfied, where $\Delta H$ represents a maximum value of the percentage of reduction in the amplitude of scanning of the light flux along the one scanning direction in the distortion correction in one scanning direction performed by the deflection control section; and the relationship of $20°<\theta<70°$ is further satisfied.

An image projection device according to a third aspect is the image projection device according to the first aspect, in which the deflection control section performs the speed correction in the other scanning direction by adjusting a drive signal for rotating the reflection part around the first axis in a display time period for displaying an image of each frame.

An image projection device according to a fourth aspect is the image projection device according to the first aspect, in which the deflection control section performs the speed correction in the other scanning direction by adjusting a drive signal for rotating the reflection part around the first axis in a display time period for displaying an image of each frame by using a correction signal.

An image projection device according to a fifth aspect is the image projection device according to the third aspect, in which the deflection control section performs the speed correction in the other scanning direction by non-linear adjustment of a waveform of the drive signal for rotating the reflection part around the first axis in a display time period for displaying an image of each frame.

An image projection device according to a sixth aspect is the image projection device according to the first aspect, in which the deflection control section performs the distortion correction in one scanning direction by strengthening and weakening the amplitude of a drive signal for reciprocatingly rotating the reflection part around the second axis in a display time period for displaying an image of each frame.

An image projection device according to a seventh aspect is an image projection device which projects an image to a projection surface, the image projection device including: a light source section; a deflection section having first and second reflection parts which reflect a light flux emitted from the light source section in space sequence, and deflecting the light flux in a two-dimensional direction by rotation of the first reflection part around a first axis and rotation of the second reflection part around a second axis which is, based on the first axis, spaced at a predetermined distance along a predetermined straight line substantially perpendicular to the first axis and which is in a relationship where the first axis is rotated by substantially 90° around the predetermined straight line; and a deflection control section which makes a control for rotating the second reflection part around the second axis by resonance driving, and rotating the first reflection part around the first axis by non-resonance driving. In the image projection device: the deflection control section controls the rotation of the second reflection part around the second axis to thereby perform a distortion correction in one direction for suppressing an image distortion along one scanning direction on the projection surface, and controls the rotation of the first reflection part around the first axis to thereby perform a speed correction in the other scanning direction for keeping substantially constant a scanning speed of the light flux along the other scanning direction which is substantially perpendicular to the one scanning direction on the projection surface; and the relationship of $10°<\theta<70°$ is satisfied, where $\theta$ represents an angle of inclination of the light flux, which is projected to the projection surface, toward the other scanning direction, relative to a normal line of the projection surface, in a case where the first reflection part is in a central position of the rotation around the first axis and the second reflection part is in a central position of the rotation around the second axis.

An image projection device according to an eighth aspect is the image projection device according to the seventh aspect, and further includes a projection optical system which projects the image to the projection surface by guiding the light flux deflected by the deflection section onto the projection surface. In the image projection device: an optical surface forming the projection optical system has a shape for performing a distortion correction in the other scanning direction for suppressing an image distortion along the other scanning direction on the projection surface, and the distortion correction in one scanning direction; the relationship of $0<\Delta H<0.2$ is satisfied, where $\Delta H$ represents a maximum value of the percentage of reduction in the amplitude of scanning of the light flux along the one scanning direction in the distortion correction in one scanning direction performed by the deflection control section; the relationship of $20°<\theta<70°$ is further satisfied.

An image projection device according to a ninth aspect is the image projection device according to the seventh aspect, in which the deflection control section performs the speed correction in the other scanning direction by adjusting a drive signal for rotating the first reflection part around the first axis in a display time period for displaying an image of each frame.

An image projection device according to a tenth aspect is the image projection device according to the seventh aspect, in which the deflection control section performs the speed correction in the other scanning direction by adjusting a drive signal for rotating the first reflection part around the first axis in a display time period for displaying an image of each frame by using a correction signal.

An image projection device according to an eleventh aspect is the image projection device according to the ninth aspect, in which the deflection control section performs the speed correction in the other scanning direction by non-linear adjustment of a waveform of the drive signal for rotating the first reflection part around the first axis in a display time period for displaying an image of each frame.

An image projection device according to a twelfth aspect is the image projection device according to the seventh aspect, in which the deflection control section performs the distortion correction in one scanning direction by strengthening and weakening the amplitude of a drive signal for reciprocatingly rotating the second reflection part around the second axis in a display time period for displaying an image of each frame.

Effects of the Invention

In the image projection device according to any one of the first to twelfth aspects, the rotation of the reflection part around the two axes is controlled under the conditions that the image distortion along one scanning direction is visually observed. Thereby, the image distortion along the one scanning direction is corrected, and the scanning speed of the light flux along the other scanning direction is kept substantially constant. This enables an image having a high image quality to be projected even in a small-size image projection device.

In the image projection device according to any one of the second to eighth aspects, even when the light flux is projected with a certain degree of large inclination relative to the projection surface, the image distortion exceeding 20 percent along the one scanning direction is corrected by the control of the rotation of the reflection part and the projection optical system, and the image distortion along the other scanning direction is corrected by the projection optical system. This enables an image having a high image quality to be projected even in a small-size image projection device.

BRIEF DESCRIPTION OF THE DRAWINGS

FIGS. 6A and 6B summarize problems of an oblique projection and correction methods.

FIGS. 7A to 7C show results of a deflection/scanning driving correction and a correction by image processing.

FIGS. 10A to 10D show waveforms of signals for a vertical scanning.

FIG. 11 is a diagram for explaining a removal of a harmonic.

FIG. 15 shows the intensity of a frequency component of a correction signal.

FIG. 16 shows the intensity of a frequency component of an AM wave signal.

FIG. 17 shows a relationship between a projection angle $\theta$ and a ratio of upper and lower sides of an image.

FIGS. 24A and 24B are diagrams for explaining the distortion of the projected image in the oblique projection state.

EMBODIMENT FOR CARRYING OUT THE INVENTION

Figure 1:
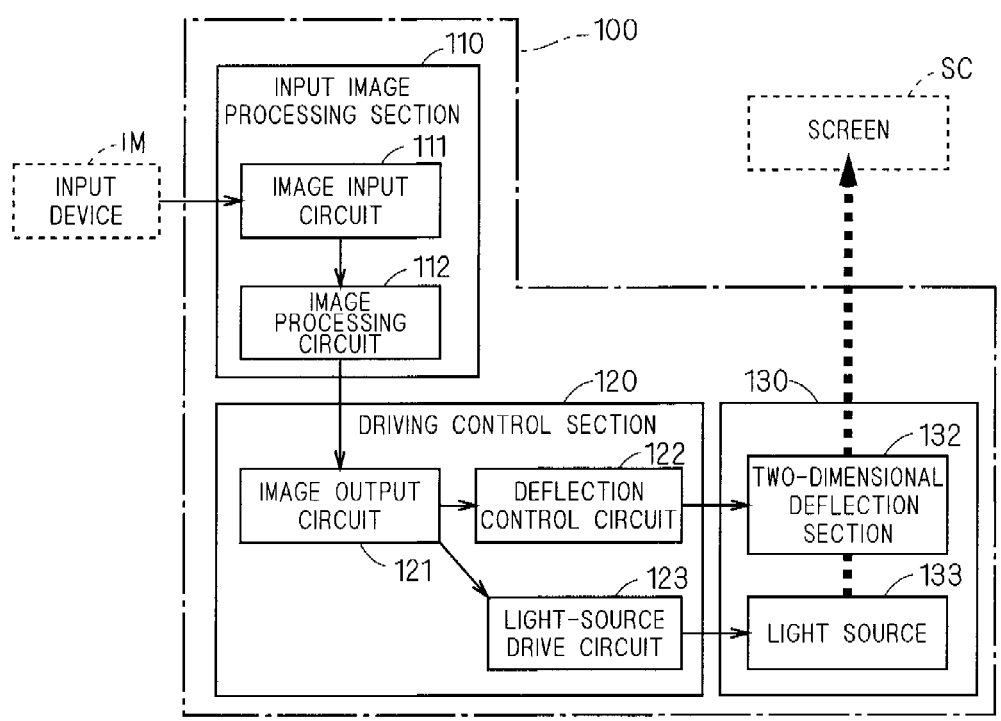
FIG. 1 is a block diagram showing a function configuration of an image projection device according to a first embodiment.

In the following, embodiments of the present invention will be described based on the drawings.

<Conventional Image Projection Device and Problems Thereof>

Firstly, prior to a description of an image projection device according to embodiments of the present invention, an image projection device according to the conventional technique and problems thereof will be described for the purpose of clarifying characteristic points of the image projection device according to the embodiments of the present invention.

Conventionally, a projector using a DMD (Digital Micromirror Device) or a liquid crystal element is known as a small-size image projection device. However, in a so-called micro-display method in which an image is enlarged and projected by using such a DMD or liquid crystal element, a relatively large illumination optical system or projection optical system are required for projecting a two-dimensional image on the DMD or the liquid crystal element, and there is a limit to downsizing of the device.

On the other hand, downsizing is allowed in a projector having a method (laser scanning method) in which the brightness of a laser beam is modulated while a micro mirror (deflecting/scanning mirror) such as a mirror (MEMS mirror) prepared by a so-called MEMS (Micro Electro Mechanical Systems) technique is reciprocatingly-rotated around two orthogonal axes to two-dimensionally scan a light flux of the laser beam on the screen. This enables downsizing because, as compared with the image projection device using the DMD or the like as described above, the size of the deflecting/scanning mirror is smaller than the DMD or the like and it suffices that an illumination optical system merely radiates the laser beam to the deflecting/scanning mirror.

<Basic Operation of Image Projection Device according to Conventional Technique>

Assuming a case where a general image signal such as an NTSC signal is used, a vertical scanning has to be performed at a low speed while a horizontal scanning has to be performed at a high speed, in order to project a high-resolution moving image on a screen by two-dimensionally scanning a laser beam on the screen by a deflecting/scanning mirror such as a MEMS mirror or two-dimensionally scanning a laser beam on the screen by a combination of rotations of two deflecting/scanning mirrors. More specifically, in the deflecting/scanning mirror, the rotation corresponding to the vertical scanning is performed at a cycle causing no visual flickering, at 60 Hz for example, in response to a vertical synchronization signal of a moving image signal, and during the cycle of the vertical scanning, the rotation corresponding to the horizontal scanning is performed at a cycle corresponding to the number of horizontal scanning lines in response to a horizontal synchronization signal of the moving image signal. A ratio between the frequencies of the vertical scanning and the horizontal scanning is the resolution in the vertical scanning direction.

Accordingly, for example, to realize a so-called XGA resolution (horizontally 1024 pixels×vertically 768 pixels), in a case of using the whole of a scan region in the longitudinal direction, it is necessary to perform the rotation corresponding to the horizontal scanning at a frequency of approximately 46 KHz (≈60×768) in the deflecting/scanning mirror. However, in a case of performing a drawing by using both an outgoing path and a return path of the horizontal scanning, it is necessary to perform the rotation corresponding to the horizontal scanning at a frequency of approximately 23 KHz which is the half of the above in the deflecting/scanning mirror.

Driving the deflecting/scanning mirror at a frequency of 23K Hz for the horizontal scanning is very high-speed driving and therefore it is preferable to use a so-called resonance driving which can realize a large mechanical amplitude at a high speed. Here, if the resonance driving is not used, the amplitude and the speed are not sufficient. Accordingly, the driving of the deflecting/scanning mirror corresponding to the horizontal scanning is preferably a so-called sine-wave driving. The "resonance driving" referred to herein is a driving utilizing a resonance phenomenon in which when the vibration frequency is changed while the magnitude of a vibration forcibly applied from the outside is constant, the amplitude sharply increases near the natural vibration frequency of a vibration system, and means driving the deflecting/scanning mirror at a frequency matched with the natural vibration frequency of the deflecting/scanning mirror. The "sine-wave driving" referred to therein means a driving in which the amount of displacement of an angle of rotation of the deflecting/scanning mirror relative to a time elapse exhibits the shape of a sine wave.

On the other hand, driving the deflecting/scanning mirror at a frequency of 60 Hz for the vertical scanning is a relatively slow driving, and therefore a driving method (hereinafter also referred to as a "non-resonance driving") using no resonance can be adopted. For example, when a frame rate (the frequency of switching of a frame image) of a moving image is 60 Hz, the amount of displacement of the angle of rotation of the deflecting/scanning mirror relative to a time elapse may be in the shape of a saw-tooth and additionally the frequency may be 60 Hz. In a case of performing a drawing by using a reciprocation of the rotation of the deflecting/scanning mirror, the amount of displacement of the angle of the rotation of the deflecting/scanning mirror relative to the time elapse may be in the shape of a triangle wave and additionally the frequency may be 30 Hz.

<Influence of Oblique Projection>

Generally, the image projection device is mainly assumed to be used in a state of being installed on a desk or the like. In order to avoid a defect of projecting an image on an installation surface to cause a so-called vignetting of the image, it is preferable, from the viewpoint of actual use, to adopt a projection method (so-called oblique projection method) in which a light is incident obliquely with respect to the center of a projection surface. However, it is also generally known that a projection from an oblique direction relative to the projection surface causes a defect (trapezoidal distortion) of distorting the image (projected image) on the projection surface.

Here, a specific description will be given of a problem occurring when the oblique projection method is adopted.

Figure 22:
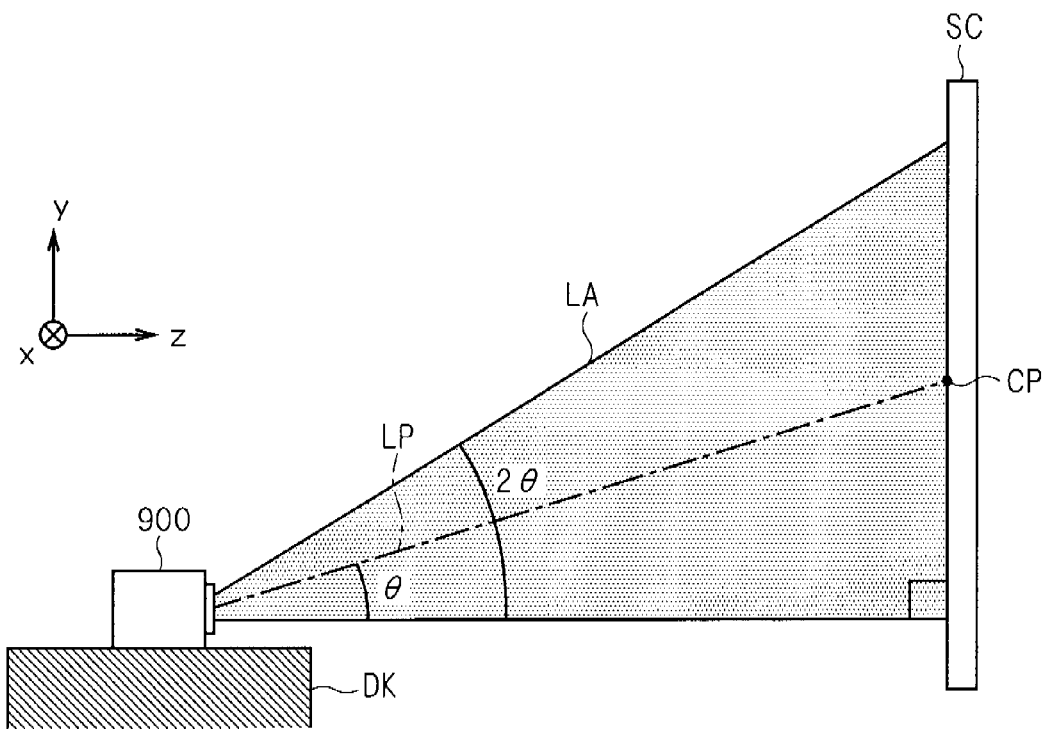
FIG. 22 shows a state of a small-size image projection device in an oblique projection state, as seen from a lateral side.

FIG. 22 shows a situation where a small-size image projection device 900 is placed on a desk DK for example, and in this state reflects a moving image on a screen SC by performing a projection while appropriately deflecting and scanning a light flux with respect to the screen SC. In FIG. 22, a region (light flux passing region) LA through which the light flux passes by being appropriately deflected is hatched with a sand-like pattern. As shown in FIG. 22, in the image projection device 900, a central axis (that is, an optical axis) LP of the light flux passing region LA extending from the image projection device 900 toward the screen SC is inclined with respect to the screen SC, in order to avoid occurrence of an image void (that is, the so-called vignetting) in a projected image on the screen SC which is otherwise caused by the light flux passing region LA being obstructed by the desk DK. In detail, the optical axis LP of the image projection device 900 is set inclined toward the side opposite to the desk DK, that is, slightly upward, so that the optical axis LP is incident on the screen SC from an oblique direction relative to it. That is, FIG. 22 shows a state (oblique projection state) in which the image projection device 900 obliquely projects an image to the screen SC forming a projection surface, as seen from the lateral side.

Here, for avoiding a complicated description, it is assumed that setting has been made such that a traveling direction of a light flux (hereinafter referred to as a "lower side forming light flux") for forming a lower side of a projected image can be substantially perpendicular to the projection surface when seen from the lateral side. That is, the lower side forming light flux and the normal line of the projection surface are substantially in parallel with each other. Additionally, the angle (hereinafter also referred to as a "projection angle") formed between the optical axis LP and the normal line of the projection surface is defined as θ, and the angle formed between a light flux (hereinafter referred to as an "upper side forming light flux") for forming an upper side of the projected image and the normal line of the projection surface is approximated to 2θ.

Figure 23:
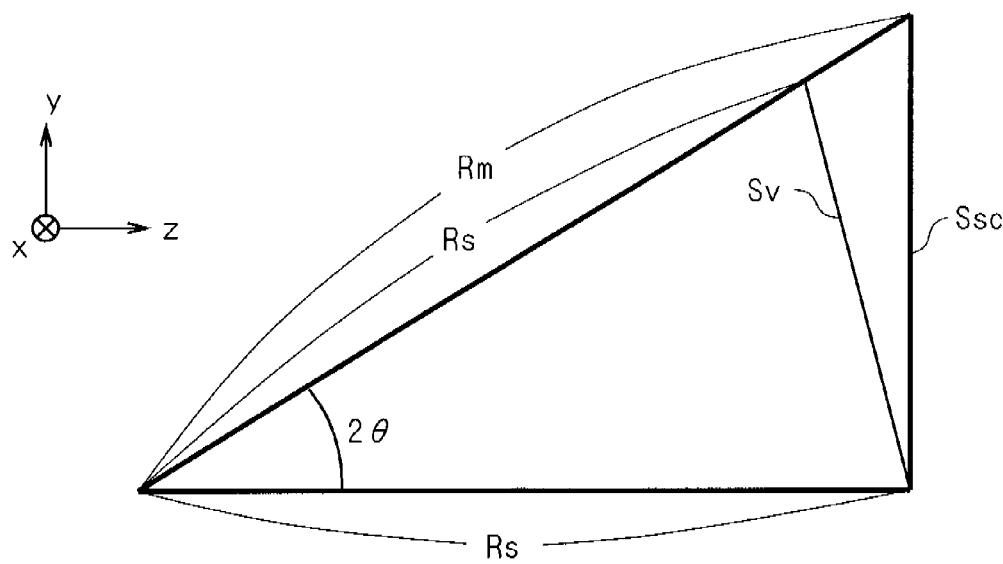
FIG. 23 is a diagram for explaining a distortion of a projected image in the oblique projection state.

FIGS. 23, 24A and 24B are diagrams for explaining a distortion of a projected image in an oblique projection state. In detail, FIG. 23 shows an outer edge of the light flux passing region LA as seen from the lateral side. Here, it is defined that a distance of traveling of the lower side forming light flux from a light source to a projection surface Ssc of the screen SC is Rs, and a distance of traveling of the upper side forming light flux from the light source to the projection surface Ssc of the screen SC is Rm. Also, a case is assumed where a virtual projection surface (hereinafter referred to as a "virtual projection surface") Sv having a planar shape is provided at a position to which the upper side forming light flux and the lower side forming light flux travel at the same distance Rs from the light source. Under such conditions, as shown in FIG. 24A, a projected image projected to the virtual projection surface Sv has a rectangular shape whose upper side and lower side have the same length Xs, and additionally rows of pixels (hereinafter also referred to as "horizontal lines") extending along a horizontal scanning direction are at substantially the same intervals. On the other hand, as shown in FIG. 24B, a projected image projected to the projection surface Ssc of the screen SC has an outer edge of a trapezoidal shape whose upper side Xm is longer than a lower side Xs and additionally, the intervals of the horizontal lines increases at an upper portion of the projected image. Such a projected image cannot be considered as a high-quality one.

In this manner, adoption of the oblique projection method causes a trapezoidal distortion (hereinafter referred to as a "trapezoidal distortion") in the projected image and additionally causes a difference in the scanning speed of the light flux with respect to a vertical direction. Accordingly, it can be considered that the problem about the projected image resulting from the adoption of the oblique projection method can be solved by performing a correction (hereinafter referred to as a "trapezoidal distortion correction") of the trapezoidal distortion and a correction (hereinafter referred to as a "vertical scanning speed correction") of the scanning speed of the light flux with respect to the vertical direction.

Thus, in order to realize a projected image having increased brightness and high-resolution, that is, having a high quality, in the image projection device which adopts the laser scanning method, it is important to suppress a variation in the scanning speed of the laser beam (that is, to ensure a uniform speed), and to suppress a distortion of a projected image. The importance thereof will further be described.

<Importance of Uniform Speed in Scanning>

Firstly, a description will be given of a uniformity (uniform speed) of a horizontal scanning speed on the projection surface (for example, the screen) using the sine-wave driving.

When the horizontal scanning is realized by using a resonance, a difference in the horizontal scanning speed occurs between the vicinity of a center of the projection surface and the vicinity of a peripheral edge. Particularly, at both ends of displacement of the rotation of the deflecting/scanning mirror corresponding to the horizontal scanning, a rotation speed is zero. Therefore, it is difficult that the entire range of the displacement of the rotation of the deflecting/scanning mirror is used for the horizontal scanning on the projection surface. For example, when 75% of a cycle (rotation cycle) of the rotation of the deflecting/scanning mirror is used for the horizontal scanning, approximately 92% (=sin [90°×0.75]×100%) of the entire range of the displacement of the rotation angle of the deflecting/scanning mirror is used to perform the horizontal scanning. Hereinafter, in the cycle of the rotation of the deflecting/scanning mirror, a time period used for the horizontal scanning will be also referred to as a "horizontal-scanning effective period", and in the entire range of the displacement of the rotation angle of the deflecting/scanning mirror, an angle range used for the horizontal scanning will be also referred to as a "horizontal-scanning effective angle range", as appropriate.

In a case where 75% of the rotation cycle is used for the horizontal scanning as described above, the scanning speed at an end portion of the horizontal-scanning effective angle range is undesirably approximately 38% (cos [90°×0.75]× 100%) of the scanning speed at the center. In this manner, as long as the sine-wave driving method is used for realizing the horizontal scanning, it is difficult to correct a difference in the horizontal scanning speed by a mechanical control to thereby ensure the uniform speed. In the following, a percentage (ratio of utilization) of a time period used for the horizontal scanning in the rotation cycle concerning the horizontal scanning will be referred to as an "H-direction time utilization ratio", and a percentage (ratio of utilization) of a time period used for the vertical scanning in the rotation cycle concerning the vertical scanning will be referred to as a "V-direction time utilization ratio", as appropriate.

The importance of the correction concerning the uniform speed of the horizontal scanning has been described so far. However, in the vertical scanning, similarly to the horizontal scanning, in a case of the sine-wave driving (reciprocating driving) of the deflecting/scanning mirror, the rotation speed is zero at both ends of the displacement of the rotation of the deflecting/scanning mirror corresponding to the vertical scanning, and therefore it is difficult that the entire range of the displacement of the rotation of the deflecting/scanning mirror is used for the vertical scanning on the projection surface. Thus, the same problem as in the horizontal scanning occurs. Additionally, as described above, the adoption of the oblique projection method breaks the uniform speed of the vertical scanning.

If the Uniform speed is broken with respect to the horizontal and vertical scannings, for example, even though a variation in the laser beam is performed at the same timing, a pixel interval is narrow in reproduction when the scanning speed is low while the pixel interval is wide in reproduction when the scanning speed is high. Thus, a difference in the size of an image region on a scanning surface, that is, an image distortion, occurs. Furthermore, an image region in which the scanning speed is low becomes relatively bright, which causes unevenness of the brightness of the image.

Therefore, a correction using an optical system (projection optical system) as in the technique of the Patent Document 1 described above is conceivable. However, it is necessary that the projection optical system is curved more largely toward a peripheral portion with respect to the horizontal and vertical directions. Additionally, it is necessary to keep other aberration characteristics good. This leads to an increase in the size of the projection optical system, and thus an increase in the size of the image projection device. Moreover, for example, to solve the problem concerning the Uniform speed in the vertical scanning, it is also conceivable to perform image processing on image data to be projected, for adjusting the size and the brightness of an image between upper and lower portions of the screen. However, this leads to a reduction in the brightness of the entire image, and therefore is not preferable.

<Importance of Correction of Image Distortion>

Figure 25:
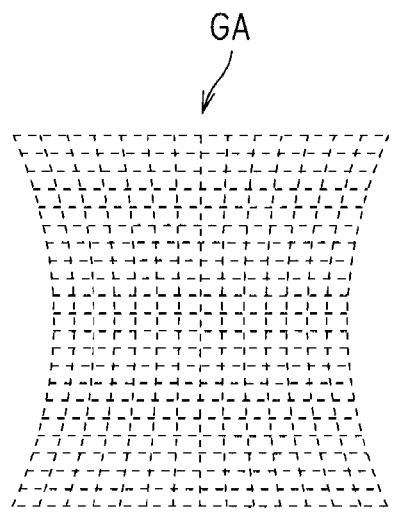
FIG. 25 is a diagram for explaining a bobbin-shaped distortion.

It is generally known that using a deflecting/scanning mirror for two-dimensionally scanning a laser beam on a projection surface causes a bobbin-shaped distortion in an image GA on a scanning surface as shown in FIG. 25. Moreover, as described above, it is also generally known that the adoption of the oblique projection method causes a trapezoidal distortion. Such an image distortion is not preferable because it deteriorates the quality of a projected image. Accordingly, in the image projection device, occurrence of various distortions in the projected image is basically inevitable problem in actual use.

Figure 26:
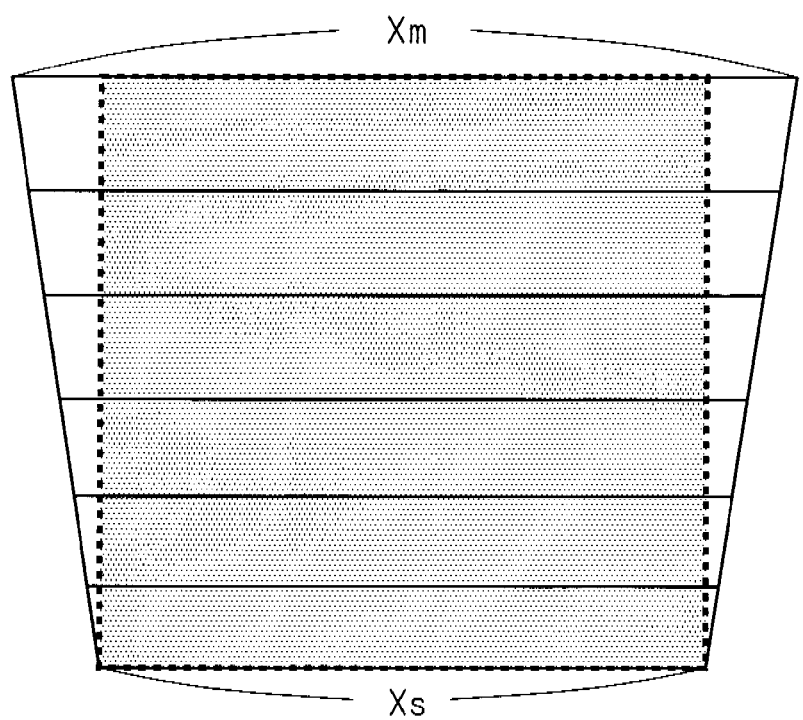
FIG. 26 is a diagram for explaining the correction by image processing.

Here, a description will be given of a case where a distortion of a projected image is corrected by the image processing proposed in the Non-Patent Document 1 described above. It is conceivable that, in a region (project region) in which an image is projected in a distorted manner on the projection surface as shown in FIG. 24B, a rectangular region as shown in FIG. 26 is adopted and image data is deformed so as to conform to the size of this region, for performing a projection. However, in this technique, due to cutout of the project region, the projected image becomes smaller to deteriorate the resolution, and additionally the brightness of the entire screen is reduced in accordance with the region cut out. Furthermore, a load of computation also increases in accordance with the amount of the image processing.

Therefore, the inventors of the present application have created an image projection device capable of providing a good image by correcting the above-mentioned four correction items, namely, (Correction Item I) the Uniform speed in the horizontal scanning direction, (Correction Item II) the Uniform speed in the vertical scanning direction, (Correction Item III) the distortion in the horizontal scanning direction, and (Correction Item IV) the distortion in the vertical scanning direction, without causing an increase in the size of the device. Hereinafter, the image projection device will be described.

In the present specification, a correction for substantially uniformizing the scanning speed (horizontal scanning speed) of the light flux along the horizontal scanning direction on the screen SC is also referred to as a "horizontal-scanning-direction speed correction". A correction for suppressing the image distortion (horizontal scanning distortion) along the horizontal scanning direction on the screen SC is also referred to as a "horizontal-scanning-direction distortion correction". A correction for substantially uniformizing the scanning speed (vertical scanning speed) of the light flux along the vertical scanning direction on the screen SC is also referred to as a "vertical-scanning-direction speed correction". A correction for suppressing an image distortion (vertical scanning distortion) along the vertical scanning direction on the screen SC is also referred to as a "vertical-scanning-direction distortion correction".

First Embodiment

Outline Configuration of Image Projection Device

FIG. 1 is a block diagram showing a function configuration of the image projection device 100 according to a first embodiment of the present invention. The image projection device 100 is a device which projects a moving image to the screen SC which is the projection surface, and mainly includes an input image processing section 110, a driving control section 120, and an optical mechanism section 130.

The input image processing section 110 includes an image input circuit 111 and an image processing circuit 112.

The image input circuit 111 receives an image signal inputted from an input device IM, and outputs it to the image processing circuit 112. The image processing circuit 112 appropriately performs image processing on the image signal from the image input circuit 111, and outputs it to the driving control section 120.

Here, examples of the input device IM include a personal computer (PC), and examples of the image signal include a typical NTSC signal. Examples of the image processing in the image processing circuit 112 include processing for correcting the Uniform speed in the horizontal scanning direction and the distortion in the vertical scanning direction which will be described later, typical y conversion processing, and processing for rearranging the order of pixel values in a case where the order of scanning pixels needs to be changed.

The driving control section 120 includes an image output circuit 121, a deflection control circuit 122, and a light-source drive circuit 123.

The image output circuit 121 outputs to the deflection control circuit 122 a signal (control signal) for controlling a timing of driving a two-dimensional deflection section 132 (which will be described later), in response to the horizontal synchronization signal and the vertical synchronization signal of the image signal, and outputs to the light-source drive circuit 123 a signal (pixel data signal) corresponding to the pixel value of the image signal. The deflection control circuit 122 gives a drive signal having a potential corresponding to the control signal from the image output circuit 121, to the two-dimensional deflection section 132. In accordance with the pixel data signal from the image output circuit 121, the light-source drive circuit 123 makes a control such that a light having a color and a brightness corresponding to a gradation of an image data signal can be emitted from a light source 133 (which will be described later). A timing of performing the control is in response to the horizontal synchronization signal and the vertical synchronization signal of the image signal.

The input image processing section 110 and the driving control section 120 may be realized as a function by a CPU reading and executing a predetermined program, or alternatively may be configured as a special electronic circuit.

The optical mechanism section 130 includes the two-dimensional deflection section 132 and the light source 133.

The light source 133 includes an element (laser element) which produces a laser beam, and a lens (collimator lens) which converts the laser beam emitted from the laser element into a substantially parallel light flux. Here, the light source 133 has a combination of a laser element which produces a read (R) laser beam and a collimating lens which converts the R laser beam into a substantially parallel light flux, a combination of a laser element which produces a green (G) laser beam and a collimating lens which converts the G laser beam into a substantially parallel light flux, and a combination of a laser element which produces a blue (B) laser beam and a collimating lens which converts the B laser beam into a substantially parallel light flux. The laser element for each color produces and emits a laser beam having a brightness corresponding to the pixel value of the image signal, in accordance with the pixel data signal from the light-source drive circuit 123.

The laser elements which produce the R and B laser beams are configured as so-called semiconductor lasers, and the laser element which produces the G laser beam is configured as a so-called semiconductor excitation solid-state laser. For example, the R laser beam has a wavelength of 630 nm, the G laser beam has a wavelength of 532 nm, and the B laser beam has a wavelength of 445 nm. When the maximum outputs of the R, G, and B laser elements are set at 150 mW, 120 mW, and 83 mW, respectively, a very brilliant image having a brilliant white and an excellent color reproducibility can be realized on the screen SC. An output value of the laser beam from the light source 133 which satisfies these conditions is approximately 100 lumen. For example, in a case where a total loss (a loss in a surface reflection, a loss caused by a control in the two-dimensional deflection section 132, a loss in color synthesis means which will be described later, and the like) in the optical system in a range from the light source 133 to the screen SC is 50%, a laser beam having a brightness of 50 lumen can be projected on the screen SC.

At the timing when the horizontal synchronization signal and the vertical synchronization signal are responded to, the light source 133 modulates the laser beam output, in accordance with the pixel data signal from the light-source drive circuit 123. As a modulation scheme for the G laser beam, a direct modulation of an excitation laser may be adopted, or an external modulation such as a so-called acousto-optical element (AO element) may be adopted. However, it is preferable to adopt a direct modulation of an excitation semiconductor laser in a method of generating a second harmonic using a so-called PPLN (Periodically Poled Lithium Niobate) waveguide, because no AO element is required.

The two-dimensional deflection section 132 has a part (reflection parts) which reflects the light flux emitted from the light source 133. The reflection parts rotate around two substantially orthogonal axes, respectively, thereby deflecting the light flux from the light source 133 so as to reflect it in a two-dimensional manner. In the present specification, by the expression "deflecting in a two-dimensional direction", it is meant that the reflection parts rotate around the two axes, respectively, to thereby separately change the traveling direction of the light flux in an up-and-down direction and a left-and-right direction, independently of each other, that is, it is meant that the light flux is deflected in the up-and-down direction while being deflect also in the left-and-right direction.

Figure 2:
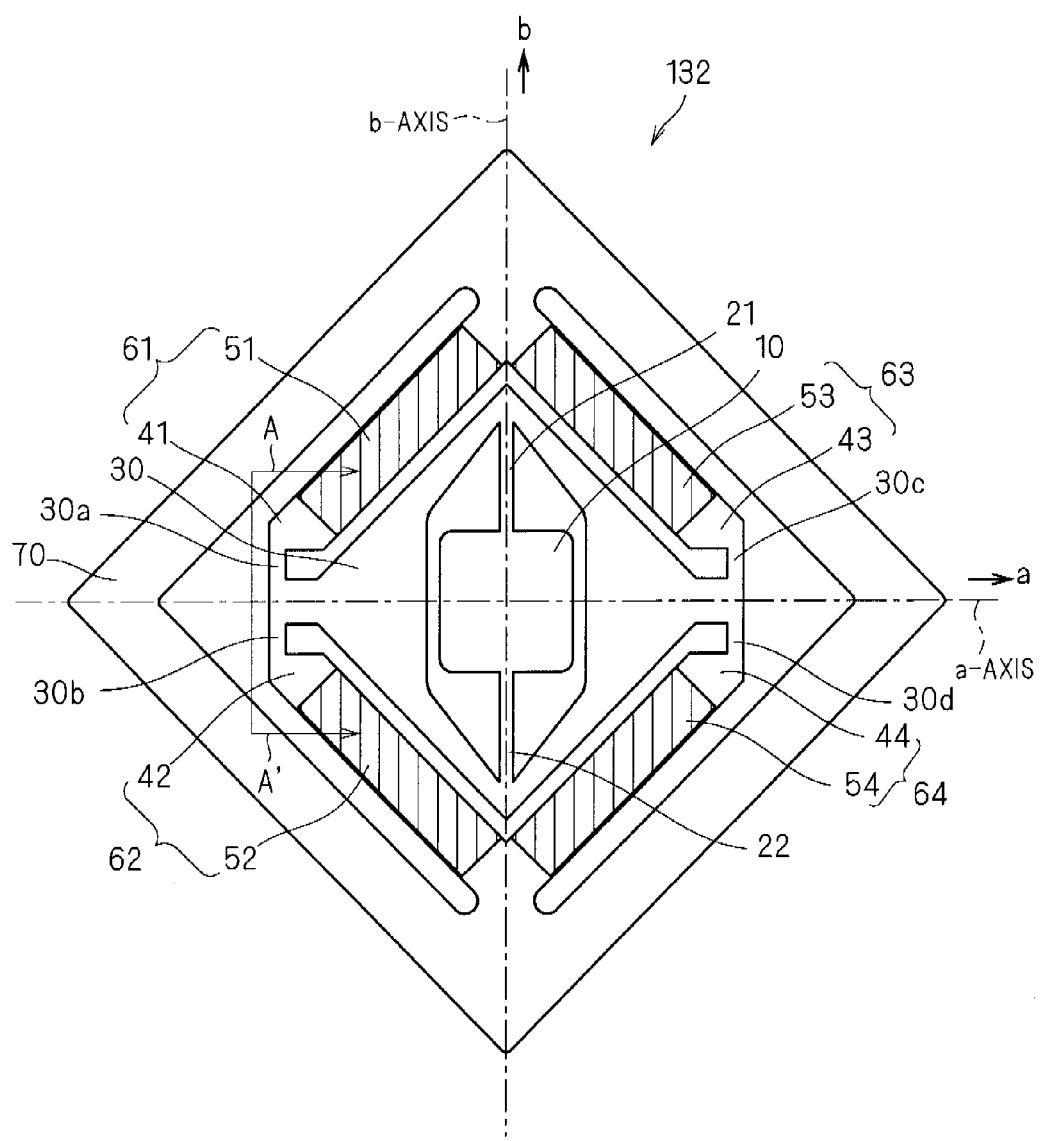
FIG. 2 shows a configuration of a two-dimensional deflection section.

FIG. 2 is an elevation view showing an exemplary configuration of the two-dimensional deflection section 132. In the following, a specific configuration of the two-dimensional deflection section 132 will be described with reference to FIG. 2.

The two-dimensional deflection section 132 is configured as a so-called MEMS (Micro Electro Mechanical Systems) mirror obtained by micromachining a silicon chip. Hereinafter, the two-dimensional deflection section 132 will be also referred to as a MEMS mirror 132 as appropriate.

The two-dimensional deflection section 132 mainly includes a deflecting/scanning mirror 10, two torsion bars 21, 22, a movable frame 30, four piezoelectric elements 51 to 54, four bridging portions 41 to 44, four thin coupling portions 30a to 30d, and a fixed frame 70.

The fixed frame 70 is fixed to a housing of the image projection device 100, and is a frame constituted by four sides which are formed by four plate-like portions being arranged in a substantially rectangular shape. Each of an outer edge and an inner edge thereof has a substantially square shape whose diagonals are substantially orthogonal a-axis and b axis. The inner edge defines a square space.

At the inside of corner portions of the fixed frame 70, two bridging portions 41, 43 are coupled at portions corresponding to the +b direction (the upper side in FIG. 2) with respect to the b-axis. The bridging portion 41 is arranged along one side of the fixed frame 70 positioned in the −a and +b direction (the upper left side in FIG. 2). The bridging portion 43 is arranged along one side of the fixed frame 70 positioned in the +a and +b direction (the upper right side in FIG. 2). At the inside of the corner portions of the fixed frame 70, two bridging portions 42, 44 are coupled at portions corresponding to the −b direction (the lower side in FIG. 2) with respect to the b-axis. The bridging portion 42 is arranged along one side of the fixed frame 70 positioned in the −a and −b direction (the lower left side in FIG. 2). The bridging portion 44 is arranged along one side of the fixed frame 70 positioned in the +a and −b direction (the lower right side in FIG. 2).

In the bridging portions 41 to 44, the piezoelectric elements 51 to 54 are attached, respectively, along directions of the extensions of the respective bridging portions 41 to 44. Accordingly, the bridging portion 41 and the piezoelectric element 51 form an extendable bridging portion 61 which extends in the −a and −b direction (toward the lower left in FIG. 2) from the inside of the corner portion positioned in the +b direction (the upper side in FIG. 2) of the fixed frame 70. The bridging portion 42 and the piezoelectric element 52 form an extendable bridging portion 62 which extends in the −a and +b direction (toward the upper left in FIG. 2) from the inside of the corner portion positioned in the −b direction (the lower side in FIG. 2) of the fixed frame 70. The bridging portion 43 and the piezoelectric element 53 form an extendable bridging portion 63 which extends in the +a and −b direction (toward the lower right in FIG. 2) from the inside of the corner portion positioned in the +b direction (the upper side in FIG. 2) of the fixed frame 70. The bridging portion 44 and the piezoelectric element 54 form an extendable bridging portion 64 which extends in the +a and +b direction (toward the upper right in FIG. 2) from the inside of the corner portion positioned in the −b direction (the lower side in FIG. 2) of the fixed frame 70.

The extendable bridging portion 61 and the extendable bridging portion 62 are arranged at a predetermined distance from each other across the a-axis, and the extendable bridging portion 63 and the extendable bridging portion 64 are arranged at a predetermined distance across the a-axis.

An end portion of the extendable bridging portion 61 at the a-axis side is coupled to the movable frame 30 by the thin coupling portion 30a. An end portion of the extendable bridging portion 62 at the a-axis side is coupled to the movable frame 30 by the thin coupling portion 30b. An end portion of the extendable bridging portion 63 at the a-axis side is coupled to the movable frame 30 by the thin coupling portion 30c. An end portion of the extendable bridging portion 64 at the a-axis side is coupled to the movable frame 30 by the thin coupling portion 30d.

Similarly to the fixed frame 70, the movable frame 30 is a frame constituted by four sides which are formed by four plate-like portions being arranged in a substantially rectangular shape. An outer edge thereof has a square shape whose diagonals are the orthogonal a-axis and b axis. An inner edge thereof defines a hexagonal space.

At the inside of corner portions of the movable frame 30, a torsion bar 21 is provided at a portion corresponding to the +b direction (the upper side in FIG. 2) with respect to the b-axis, so as to extend in the −b direction (the lower side in FIG. 2). At the inside of the corner portions of the movable frame 30, a torsion bar 22 is provided at a portion corresponding to the −b direction (the lower side in FIG. 2) with respect to the b-axis, so as to extend in the +b direction (the upper side in FIG. 2).

The deflecting/scanning mirror 10 is coupled to an end portion of the torsion bar 21 not coupled to the movable frame 30, and the deflecting/scanning mirror 10 is coupled to an end portion of the torsion bar 22 not coupled to the movable frame 30. That is, the torsion bars 21, 22 support the deflecting/scanning mirror 10 so as to sandwich the deflecting/scanning mirror 10 from the +Y direction side and the −Y direction side. In other words, the movable frame 30 supports the torsion bars 21, 22 together with the deflecting/scanning mirror 10.

The deflecting/scanning mirror 10 is a reflecting mirror having a square shape whose outer edges are constituted by two sides substantially parallel to the a-axis and two sides substantially parallel to the b-axis. The deflecting/scanning mirror 10 is arranged substantially at the center of the two-dimensional deflection section 132, and reflects a laser beam to be projected.

Each of the two torsion bars 21, 22 is thin and has an elongated shape, and therefore relatively easily exhibits elastic deformation. Each of the thin coupling portions 30a to 30d is also thin and narrow, and therefore relatively easily exhibits elastic deformation.

In a specific rotation operation of the deflecting/scanning mirror 10, when voltages are appropriately applied to the piezoelectric elements 51 to 54, the lengths of the piezoelectric elements 51 to 54 change in accordance with the voltages applied thereto, so that the bridging portions 41 to 44 to which the piezoelectric elements 51 to 54 are attached extend along the direction of extensions thereof. That is, the extendable bridging portions 61 to 64 extend and retract along the direction of extensions thereof. Thus, for example, the deflecting/scanning mirror 10 rotates around the a-axis, when a voltage applied to the piezoelectric elements 51, 53 and a voltage applied to the piezoelectric elements 52, 54 are alternately switched between positive and negative, in other words, when voltages of opposite phases are applied to the piezoelectric elements 51, 53 and the piezoelectric elements 52, 54. On the other hand, for example, the deflecting/scanning mirror 10 rotates around the b-axis, when a voltage applied to the piezoelectric elements 51, 52 and a voltage applied to the piezoelectric elements 53, 54 are alternately switched between positive and negative, in other words, when voltages of opposite phases are applied to the piezoelectric elements 51, 52 and the piezoelectric elements 53, 54.

By applying a drive signal for realizing the rotation of the deflecting/scanning mirror 10 around the a-axis and a drive signal for realizing the rotation of the deflecting/scanning mirror 10 around the b-axis to the four piezoelectric elements 51 to 54 in a superimposed manner, the deflecting/scanning mirror 10 performs the resonance driving around the b-axis with the torsion bars 21, 22 serving as a fulcrum point, and a driving for rotating the movable frame 30 together with the deflecting/scanning mirror 10 and the torsion bars 21, 22 around the a-axis. Accordingly, in spite of a single element having the single deflecting/scanning mirror 10, a low-speed rotation around the a-axis and a high-speed rotation around the b-axis using the resonance driving can be simultaneously performed. Thus, by deflecting the laser beam along two different directions, the horizontal scanning and the vertical scanning of the laser beam on the screen SC can be simultaneously performed. Here, it is preferable that the two-dimensional scanning for simultaneously performing the horizontal scanning and the vertical scanning is performed using a single element, in view of the reduction of the number of parts of the two-dimensional deflection section 132, and also in view of the reduction of the manufacturing cost and the reduction of works required for adjusting the element.

Hereinafter, a description will be given based on an assumption that an effective diameter (pupil diameter) Φ of the MEMS mirror 132 is 1 mm.

The light flux deflected by the above-described two-dimensional deflection section 132 is projected onto the screen SC serving as the projection surface, and thereby the moving image is projected on the screen SC. In FIG. 1, the arrow-headed bold broken line indicates that the laser beam from the light source 133 reaches the screen SC through the two-dimensional deflection section 132. A specific configuration of the optical mechanism section 130 including the two-dimensional deflection section 132 and the light source 133 will further be described later.

In this manner, an image projection system is formed in which the image data from the input device IM is outputted on the screen SC in a visible manner by using the image projection device 100, the input device IM, and the screen SC.

<Mode of Use of Image Projection Device>

Figure 3:
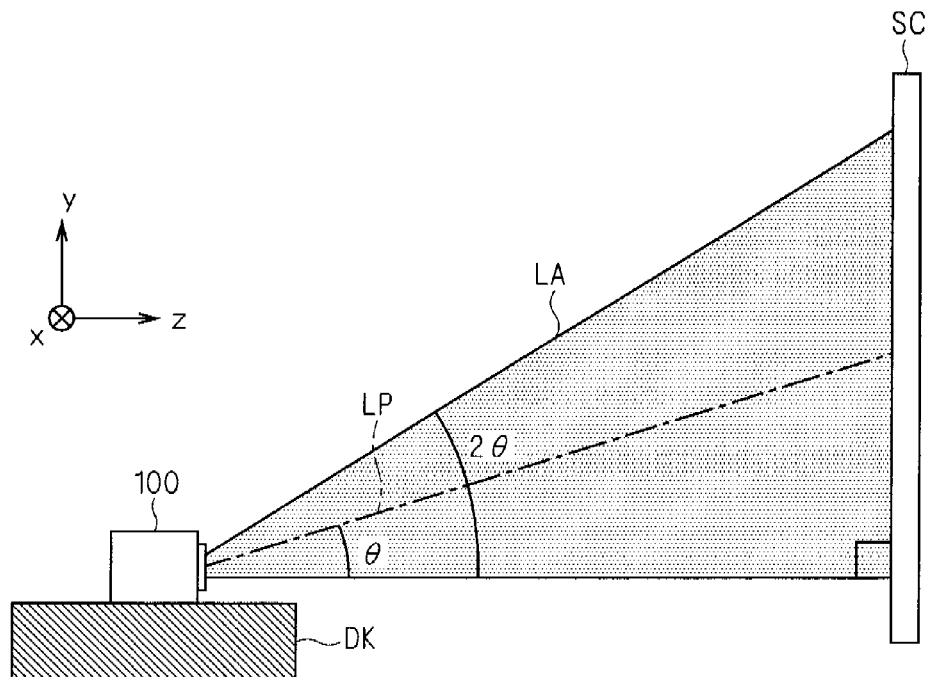
FIG. 3 schematically shows an exemplary mode of use of the image projection device.

FIG. 3 schematically shows a typical example of mode of use of the image projection device 100, as seen from the lateral side in a projection direction.

Similarly to FIG. 22, FIG. 3 shows a situation where the image projection device 100 is placed on a desk DK for example, and in this state reflects a moving image on the screen SC by performing a projection while appropriately deflecting and scanning a light flux with respect to the screen SC. In FIG. 3, a region (light flux passing region) LA through which the light flux passes by being appropriately deflected is hatched with a sand-like pattern.

As shown in FIG. 3, in the image projection device 100, a central axis (that is, an optical axis) LP of the light flux passing region LA extending from the image projection device 100 toward the screen SC is inclined with respect to the screen SC, in order to avoid occurrence of an image void (that is, the so-called vignetting) in a projected image on the screen SC which is otherwise caused by the light flux passing region LA being obstructed by the desk DK. In detail, the optical axis LP of the image projection device 100 is set inclined toward the side opposite to the desk DK, that is, slightly upward, so that the optical axis LP is incident on the screen SC from an oblique direction relative to it. That is, FIG. 3 shows a state (oblique projection state) in which the image projection device 100 obliquely projects an image to the screen SC forming a projection surface, as seen from the lateral side. Here, it is assumed that a traveling direction of a light flux (lower side forming light flux) for forming a lower side of the projected image is substantially perpendicular to the projection surface when seen from the lateral side, and an angle (projection angle) formed between the optical axis LP and the normal line of the projection surface is defined as θ. In other words, the projection angle θ is the angle of inclination of the light flux projected from the deflecting/scanning mirror 10 to the screen SC relative to the normal line of the screen SC in a case where the deflecting/scanning mirror 10 is in the central position of the rotation around the a-axis and the b-axis. Here, an angle formed between a light flux (upper side forming light flux) for forming an upper side of the projected image and the normal line of the projection surface is defined approximately as 2θ.

<Outline Configuration of Optical Mechanism Section>

Figure 4:
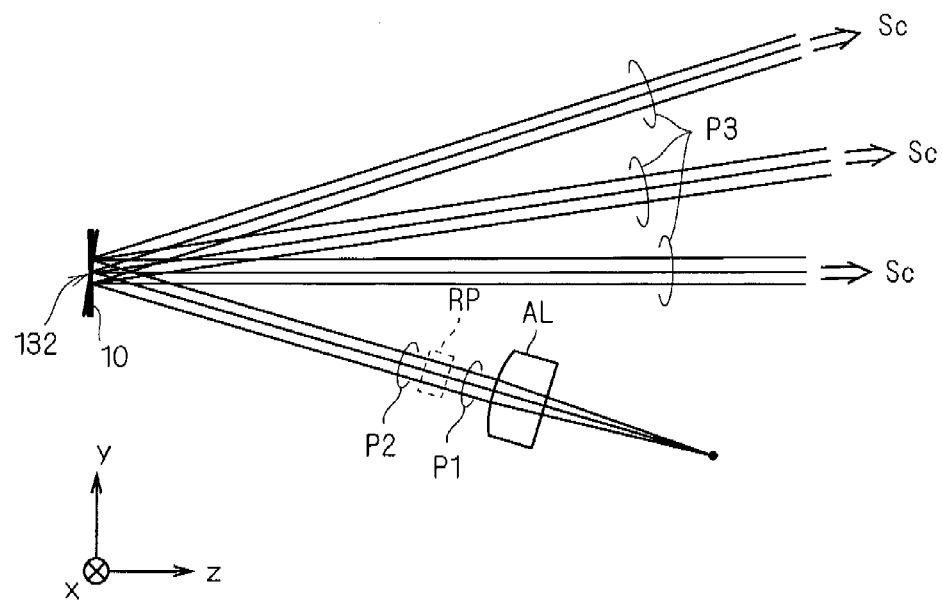
FIG. 4 shows an outline configuration of an optical mechanism section.
Figure 5:
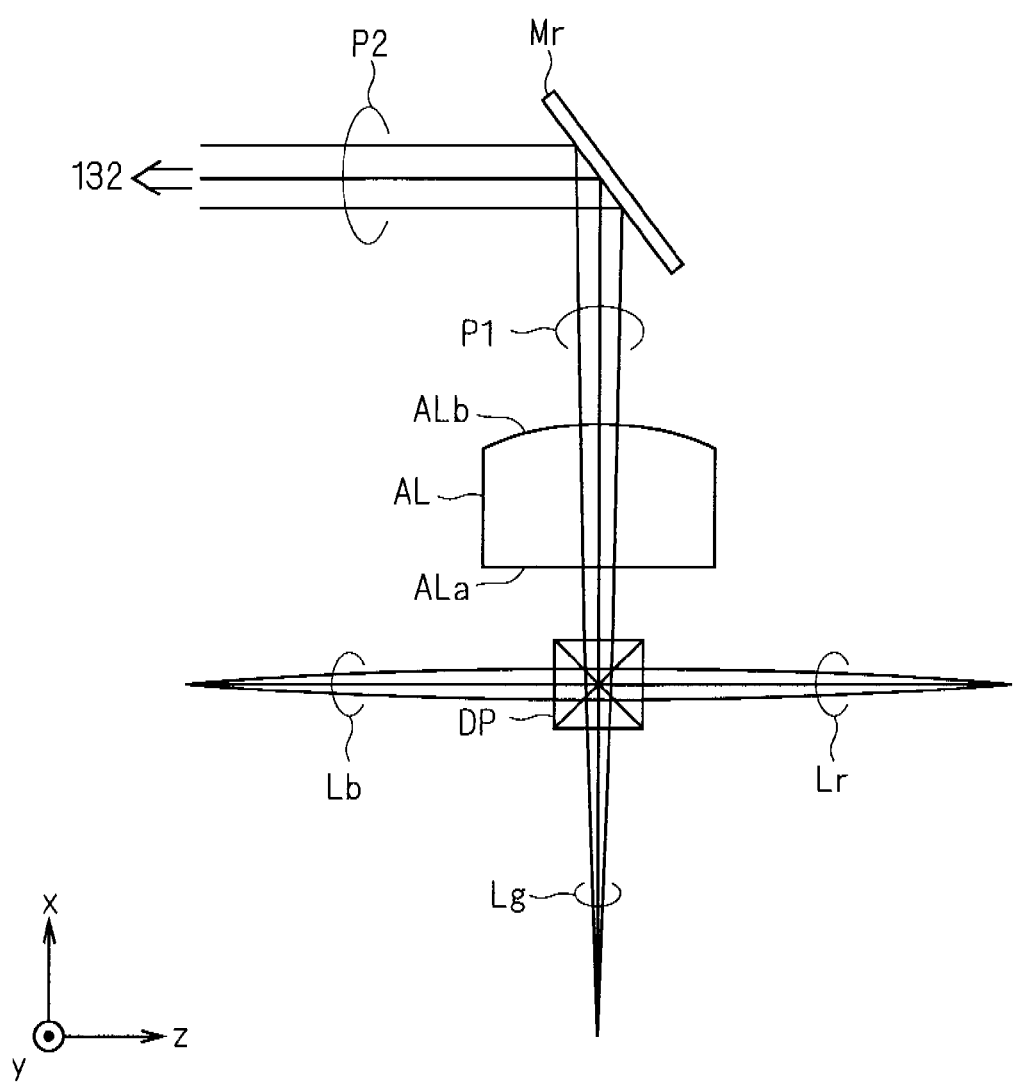
FIG. 5 shows an outline configuration of the optical mechanism section.

FIGS. 4 and 5 show an outline configuration of the optical mechanism section 130. FIG. 4 schematically shows an optical path of the light flux directed from the light source 133 side toward the screen SC as seen from the lateral side, and FIG. 5 schematically shows an optical path of the light flux directed from the light source 133 toward the two-dimensional deflection section 132 as seen from the upper side. In FIGS. 4 and 5, three orthogonal xyz axes are shown for the purpose of clarifying an orientation relationship. Although FIG. 4 schematically shows the optical path, the optical path at the light source 133 side is actually, at a position near a region RP (region enclosed by a broken line in the drawing), directed toward a direction perpendicular to the drawing sheet by a reflection mirror Mr (which will be described later), as shown in FIG. 5. In FIG. 5, the R, G, and B laser beams are slightly out of alignment for the sake of convenience, and FIG. 4 shows optical paths of the light flux deflected at three different angles by the rotation of the deflecting/scanning mirror 10 of the two-dimensional deflection section 132 for the sake of convenience.

The optical mechanism section 130 is configured with a laser element (not shown) which produces a laser beam of each color, a collimator lens (not shown) for each color, a prism DP, an anamorphic lens AL, the reflection mirror Mr, and the two-dimensional deflection section 132, in the mentioned order from the light source 133 side.

The prism DP is means (color synthesis means) for synthesizing laser beams Lr, Lg, and Lb of three colors R, G, and B which are incident thereon in a substantially perpendicular manner. A light obtained by the synthesis in the prism DP is incident on the anamorphic lens AL. Instead of a prism, a combination of dichroic mirrors may be adopted as the color synthesis means.

The anamorphic lens AL is an incident optical system whose surface at the light source 133 side, that is, an entrance surface Ala of the laser beam is a plane and whose surface (exit surface) Alb at the laser beam exit side is a surface (anamorphic surface) having different radii of curvature between its lateral direction and its longitudinal direction. A light flux P1 emitted from the exit surface Alb is reflected by the reflection mirror Mr and its exit direction is changed by approximately 90°, and a resultant light flux P2 is incident on the two-dimensional deflection section 132.

In the two-dimensional deflection section 132, the deflecting/scanning mirror 10 appropriately rotate around two axes (a-axis, b-axis), and thereby the light flux P2 is deflected to become a light flux P3 which is then projected to the screen SC.

<Outline of Correction>

FIGS. 6A and 6B summarize the correction in the image projection device 100 according to this embodiment. FIG. 6A shows problems caused by the oblique projection method, and FIG. 6B collectively shows correction methods in the image projection device 100.

As shown in FIG. 6A, the adoption of the oblique projection method causes the trapezoidal distortion which corresponds to the horizontal scanning distortion, and causes a variation in the vertical scanning speed on the screen SC (that is, a problem that intervals of rows of pixels along the horizontal scanning direction, namely, intervals of the horizontal lines are non-uniform).

For the trapezoidal distortion in the horizontal scanning direction, as shown in FIG. 6B, a correction (hereinafter referred to as a "deflection/scanning driving correction") based on a drive control of the two-dimensional deflection section 132 is performed. To be more specific, the amplitude of the two-dimensional deflection section 132 in the horizontal scanning is gradually changed in accordance with the degree of deflection in the vertical scanning, to thereby correct the trapezoidal distortion in the horizontal scanning direction. For the variation in the vertical scanning speed, too, as shown in FIG. 6B, the deflection/scanning driving correction based on the drive control of the two-dimensional deflection section 132 is performed. To be more specific, in the rotation of the two-dimensional deflection section 132 for the vertical scanning, the rotation with a substantially uniform speed is changed into the rotation with a non-uniform speed, to thereby correct the variation in the vertical scanning speed on the projection surface. As a result of such corrections, the trapezoidal distortion in the horizontal scanning direction and the variation in the vertical scanning speed are corrected without causing the defects (a deterioration in the resolution, a deterioration in the brightness of the entire screen, and an increase in the load of computation) due to the image correction as shown in FIG. 26.

It is not easily to handle the bobbin-shaped distortion (FIG. 25) caused by the driving of the two-dimensional deflection section 132, and the variation in the horizontal scanning speed, by the deflection/scanning driving correction. Therefore, they are handled by a correction (hereinafter referred to as an "image correction") using the image processing.

FIGS. 7A to 7C show results of the correction by the deflection/scanning driving correction and the image correction. When the oblique projection method is adopted to project a simply rectangular image to the screen SC, a projected image is largely distorted as shown in FIG. 7A. More specifically, the projected image is largely distorted due to the trapezoidal distortion caused by the oblique projection, the variation in the vertical scanning speed, the bobbin-shaped distortion caused by the driving of the two-dimensional deflection section 132, and the variation in the horizontal scanning speed. Against such a problem, if the trapezoidal distortion and the variation in the vertical scanning speed are corrected by the deflection/scanning driving correction, the projected image becomes an image in which the rows of pixels (horizontal lines) along the horizontal scanning direction have substantially the same length and the rows of pixels (horizontal lines) along the horizontal scanning direction are at substantially regular intervals, as shown in FIG. 7B. Moreover, a correction of cutting out a projection region is performed using the image processing, the projected image becomes an image in which the rows of pixels (horizontal lines) along the horizontal scanning direction are substantially linear and the rows of pixels (hereinafter also referred to as a "vertical line") along the vertical scanning direction are at substantially regular intervals as shown in FIG. 7C.

Next, a description will be given of a specific correction method for the aforementioned four correction items, namely, (Correction Item I) the Uniform speed in the horizontal scanning direction, (Correction Item II) the Uniform speed in the vertical scanning direction, (Correction Item III) the distortion in the horizontal scanning direction, and (Correction Item IV) the distortion in the vertical scanning direction.

<(Correction Item I) Uniform Speed in Horizontal Scanning Direction>

The principle of this method for correcting the Uniform speed in the horizontal scanning direction will be briefly described. Here, corrected are a variation (hereinafter also referred to as a "variation in intervals of vertical lines") arising in intervals of the rows of pixels (vertical lines) along the vertical scanning direction of the projected image and a variation in the brightness of each row of pixels along the horizontal scanning direction of the projected image, which are caused by the variation in the scanning speed of the light flux occurring on the screen SC.

Firstly, in the image processing circuit 112, the image signal is corrected so as to prevent a variation from occurring in the intervals of the rows of pixels (vertical lines) along the vertical scanning direction of the projected image. In more detail, the image signal is corrected so as to cancel a variation which arises in the intervals of the rows of pixels (vertical lines) along the vertical scanning direction of the projected image in a case where the Uniform speed in the horizontal scanning direction is not corrected. More specifically, the image signal is corrected so as to make the interval of the pixels along the horizontal direction of the image relatively narrower near a central portion and wider toward an end portion.

In the image processing circuit 112, the image signal is corrected so as to prevent occurrence of a variation in the brightness in the horizontal scanning direction of the projected image. In more detail, the image signal is corrected so as to cancel a variation in the brightness in the horizontal scanning direction which arises in the projected image in a case where the Uniform speed in the horizontal scanning direction is not corrected. More specifically, the image signal is corrected such that, in each row of pixels along the horizontal direction of the image, central pixels have relatively higher pixel values (for example, the gradation) and pixels nearer an end portion have relatively lower pixel values.

A distribution of the horizontal scanning speed of the light flux on the screen SC can be previously recognized in designing or by way of experiment. Therefore, the image processing circuit 112 may be set so as to perform the image processing based on a correction coefficient according to the previously recognized distribution of the horizontal scanning speed.

As described above, when the interval of pixels along the horizontal direction of the image is relatively narrower near the central portion and becomes wider toward the end portion, it is necessary that a timing of light emission of the light source 133 is adjusted in accordance with the intervals of pixels. Additionally, when, in each row of pixels along the horizontal direction of the image, central pixels have relatively higher pixel values (for example, the gradation) and pixels nearer the end portion have relatively lower pixel values, it is necessary that a time period of light emission of the light source 133 or the intensity of light emission of the light source 133 is adjusted in accordance with the pixel value.

Here, a description will be given of a control of the light source 133 in a case of correcting an approximately 0.38 times difference in the scanning speed which is caused by using 75% of the rotation cycle of the deflecting/scanning mirror 10 for the horizontal scanning.

The number of clocks corresponding to one dot (that is, one pixel or one picture element) is varied between the center and the end portion of the projection surface of the screen SC along the horizontal scanning direction, so that an interval of occurrence of the clock is varied by approximately 0.4 times. More specifically, for example, one dot is divided into ten clocks, and one dot is expressed by ten clocks in a peripheral portion while one dot is expressed by four clocks in a central portion. Due to such expression of each dot, the timing of light emission and the time period of light emission of the light source 133 are adjusted. In a case where, for example, a moving image has a frame rate of 60 Hz and a resolution of XGA, a frequency of approximately 470 MHz (=60×1024× 768×10[Hz]) is required for a modulation of the laser beam. Under this condition, the light source 133 capable of a high-speed modulation by emitting a pulsed light having a light-emission time period of approximately 2.1 nanoseconds (ns) in one clock may be used.

For example, in order to express a resolution of XGA with a frame rate of 60 Hz by 8 bits (256 gradations), a frequency of the operation of the image processing circuit 112 and the light-source drive circuit 123 may be set at approximately 12 GHz (=60×1024×768×256[Hz]). Examples of such a circuit capable of a high-speed computation process include an FPGA (Field Programmable Gate Array) circuit.

Here, the timing of light emission and the time period of light emission of the light source 133 for expressing one dot are adjusted by varying the number of clocks which express one dot of the image. However, this is not limitative. For example, it may be acceptable that the timing of light emission of the light source 133, that is, an interval of light emission, is adjusted and additionally the intensity of light emission of the light source 133 is adjusted while the time period of light emission of the pulsed light for expressing one dot is kept fixed.

When the uniform speed in the horizontal scanning direction is corrected by the image processing in this manner, a load of computation required for the image processing increases, but a high-quality image project can be realized while avoiding the defects such as an increase in the size of the device and an increase in the cost which are caused when the projection optical system is used.

<(Correction Item II) Uniform Speed in Vertical Scanning Direction>

In the image projection device 100, by adding a few circuits, the uniform speed in the vertical scanning direction is realized by the correction based on the drive control of the two-dimensional deflection section 132.

Firstly, the principle of this method for correcting the scanning speed in the vertical scanning direction will be briefly described.

FIGS. 8A to 8D show the principle of a method for correcting the scanning speed in the vertical scanning direction.

Figure 8A:
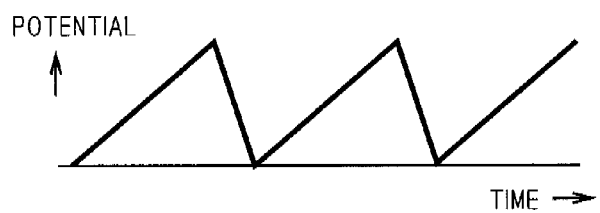
FIGS. 8A to 8D show the principle of a method for correcting a scanning speed for a vertical scanning direction.
Figure 8B:
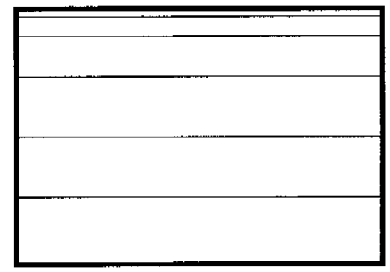
Figure 8C:
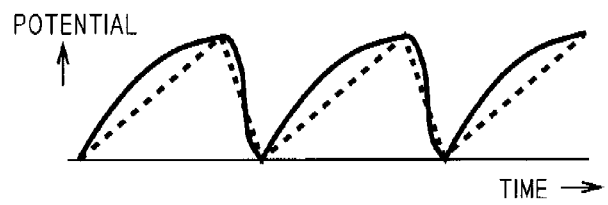
Figure 8D:
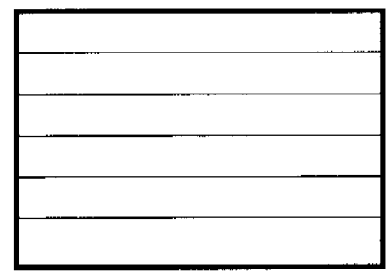

For example, a case is assumed where when a drive signal (bold line) having a saw-teeth shape as shown in FIG. 8A is applied to rotate the deflecting/scanning mirror 10 of the two-dimensional deflection section 132 around the a-axis at a uniform speed, the vertical scanning speed becomes higher toward a lower portion of the image on the screen SC as shown in FIG. 8B because of an angular relationship between the image projection device 100 and the screen SC, for example. In such a case, a difference in speed is appropriately made in the speed of rotation of the deflecting/scanning mirror 10 of the two-dimensional deflection section 132 around the a-axis. For example, as shown in FIG. 8C, a drive signal (bold line) obtained by appropriately correcting a waveform of a drive signal (broken line) having a saw-teeth shape is given, to rotate the deflecting/scanning mirror 10 of the two-dimensional deflection section 132 around the a-axis. Thereby, an appropriate difference is made in the rotation speed, so that the vertical scanning speed is adjusted so as to be substantially constant on the screen SC as shown in FIG. 8D.

Next, a method for correcting the scanning speed in the vertical scanning direction will be described with a specific example.

Figure 9:
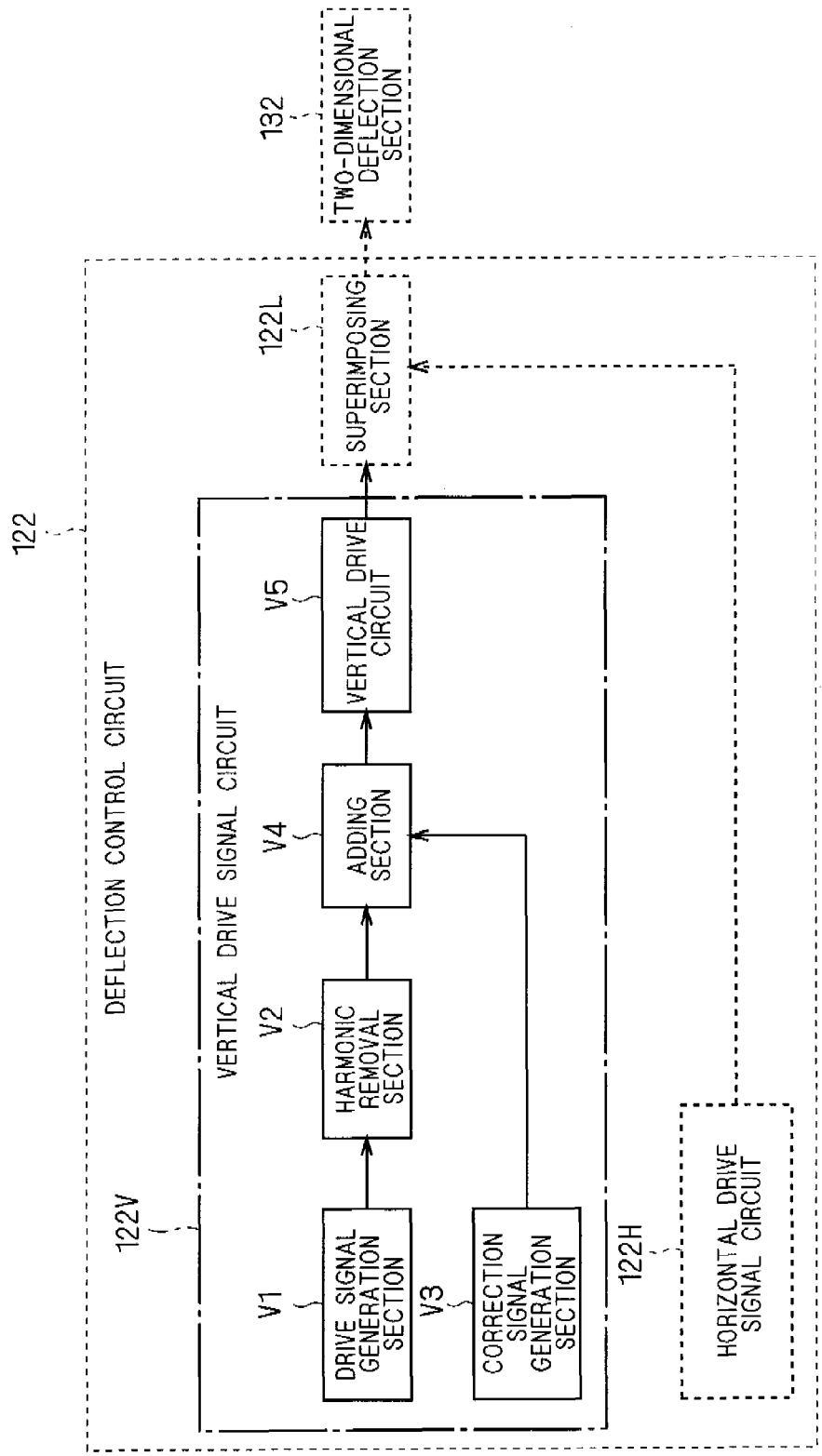
FIG. 9 is a block diagram showing a function configuration of a vertical drive signal circuit.

FIG. 9 is a block diagram showing a function configuration of a vertical drive signal circuit 122V which corrects the scanning speed in the vertical scanning direction, and FIGS. 10A to 10D show waveforms of signals. The vertical drive signal circuit 122V is realized as a function included in the deflection control circuit 122.

The vertical drive signal circuit 122V includes a drive signal generation section V1, a harmonic removal section V2, a correction signal generation section V3, an adding section V4, and a vertical drive circuit V5.

The drive signal generation section V1 generates a drive signal (FIG. 10A) having a saw-teeth shaped waveform which is to be given to the two-dimensional deflection section 132 in order to scan the laser beam projected on the screen SC at a constant speed, that is, to linearly scan the laser beam, and outputs the drive signal to the harmonic removal section V2. A drive signal (hereinafter also referred to as a saw-teeth shaped drive signal") having a saw-teeth shaped waveform shown in FIG. 10A has a time period (linear time period) in which the signal intensity linearly increases.

The harmonic removal section V2 generates a signal (FIG. 10B) obtained by removing an unnecessary harmonic component from the drive signal (FIG. 10A) from the drive signal generation section V1, and outputs the signal to the adding section V4. A waveform of the drive signal obtained after the removal of the harmonic, which is shown in FIG. 10B, loses the sharpness, and the linear time period is shortened. Normally, the drive signal as shown in FIG. 10B is applied to the two-dimensional deflection section 132, and the linear time period is applied to a time period (display time period) in which an image of each frame is displayed. Here, the drive signal is corrected in order to make the vertical scanning speed substantially constant. A method for removing the harmonic in the harmonic removal section V2 will be further described later.

The correction signal generation section V3 generates a correction signal (FIG. 10C) for correcting the scanning speed along the vertical scanning direction to make the vertical scanning speed substantially constant, and outputs the correction signal to the adding section V4. Since the scanning speed in the vertical scanning direction is previously identified in optical designing, a waveform of the correction signal may be set to be a waveform capable of canceling a variation in this vertical scanning speed.

The adding section V4 generates a signal (FIG. 10D) obtained by adding the correction signal (FIG. 10C) from the correction signal generation section V3 to the signal (FIG. 10B) from the harmonic removal section V2, and outputs the signal to the vertical drive circuit V5. For example, as shown in FIG. 10D, the drive signal is adjusted such that a waveform in the linear time period corresponding to the display time period is not linear.

The vertical drive circuit V5 outputs a voltage (or a current) necessary for the rotation around the a-axis to the two-dimensional deflection section 132, in accordance with the signal (FIG. 10D) from the adding section V4.

Here, focusing only on the rotation of the deflecting/scanning mirror 10 around the a-axis, for example, the signal shown in FIG. 10D may be applied, without any change, to the upper pair of piezoelectric elements 51, 53 in FIG. 2, and the signal having the phase opposite to the phase of the signal shown in FIG. 10D may be applied to the lower pair of piezoelectric elements 52, 54 in FIG. 2. Positive and negative terminals are provided in each of the piezoelectric elements 51 to 54, and a potential of the signal shown in FIG. 10D is appropriately applied thereto.

However, actually, in a superimposing section 122L, the voltage (or the current) outputted from the vertical drive circuit V5 is superimposed on a voltage (or a current) which is outputted from a horizontal drive signal circuit 122H and necessary for the rotation of the two-dimensional deflection section 132 around the b-axis, and then applied to the two-dimensional deflection section 132, that is, to the piezoelectric elements 51 to 54. A specific description of the horizontal drive signal circuit 122H will be given in describing the correction of the distortion in the horizontal scanning direction.

In this manner, the drive signal for rotating the deflecting/scanning mirror 10 around the a-axis is adjusted to correct the scanning speed in the vertical scanning direction, and thus the uniform speed in the vertical scanning direction is ensured. Here, the drive signal for rotating the deflecting/scanning mirror 10 around the a-axis is adjusted by the correction signal. However, this is not limitative. The drive signal for rotating the deflecting/scanning mirror 10 around the a-axis may be appropriately adjusted by computation.

The removal of the harmonic in the harmonic removal section V2 will be described.

FIG. 11 is a diagram for explaining the removal of the harmonic in the harmonic removal section V2. In FIG. 11, the horizontal axis represents a frequency. Shown are the intensity (amplitude) of a frequency component in a drive signal (hereinafter also referred to as a "saw-teeth shaped drive signal") having a saw-teeth shaped waveform with a frequency of fv, a relationship (curve Ld) between the driving frequency given to the two-dimensional deflection section 132 and the maximum angle of rotation around the a-axis, and filter characteristics (curve Fs) in the harmonic removal section V2.

As shown in FIG. 11, the saw-teeth shaped drive signal has frequencies in a wide frequency range NS including the basic frequency fv and a high-order harmonic component.

As represented by the curve Ld in FIG. 11, the two-dimensional deflection section 132 responds particularly to a harmonic component near a mechanical resonance frequency fvo of the two-dimensional deflection section 132 among harmonic components included in the saw-teeth shaped drive signal whose frequency is fv. Accordingly, a so-called ringing occurs in the rotation of the two-dimensional deflection section 132 around the a-axis, and a ringing also occurs in the vertical scanning of the laser beam on the screen SC, to cause a deterioration in the uniform speed of the vertical scanning. A harmonic component having a frequency equal to or higher than the mechanical resonance frequency fvo has adverse effects, but no favorable effect, upon the driving of the two-dimensional deflection section 132. Therefore, it is necessary to remove the harmonic component near the mechanical resonance frequency fvo and the high-order harmonic exceeding that harmonic component.

However, as a result of the removal of the harmonic component, the saw-teeth shaped drive signal loses its sharpness, to shorten the time period (linear time period) in which the signal intensity linearly changes (FIG. 10B). This shortening of the linear time period limits a time period in which the vertical scanning is performed at a substantially constant speed, that is, limits the time period (display time period) in which a one-frame image is displayed. The degree of this limitation is influenced by the level of the mechanical resonance frequency fvo. In order to obtain a good case where a relatively long linear time period is provided, designing may be performed such that a harmonic of approximately ten times or more of the frequency fv of the saw-teeth shaped drive signal. That is, in order to ensure a certain extent of the linear time period in which the vertical scanning speed is substantially constant, a range of the order of the harmonic to be removed may be, roughly, 10 or more (specifically, m=10 or more).

Therefore, a configuration of the harmonic removal section V2 has both filter characteristics of a filter (notch filter, the a and b parts of the curve Fs in FIG. 11) having characteristics (blocking characteristics) which cancels mechanical resonance frequency characteristics by removing from the saw-teeth shaped drive signal harmonics mfv and (m+1)fv near the mechanical resonance frequency fvo (particularly, before and after fvo), and filter characteristics of a low pass filter (LPF, the c part of the curve Fs in FIG. 11) which removes higher-order harmonic components.

In another adoptable configuration, a waveform signal, in which the harmonic component near the mechanical resonance frequency fvo and the higher-order harmonic components are removed and additionally in which as long a linear time period as possible is ensured, is once generated as digital data and stored, and after a correction signal is added, a conversion (D/A conversion) from the digital data into analog data is performed and outputted to the vertical drive circuit V5.

<(Correction Item III) Distortion in Horizontal Scanning Direction>

Normally, in consideration of usability, an image projection device is often placed and projects an image to the screen SC while being inclined in the vertical direction as shown in FIG. 3. Generally, when a projection is performed obliquely relative to the screen SC, the so-called trapezoidal distortion occurs in which the widths of upper and lower portions of the projected image are different from each other. Depending on conditions, the bobbin-shaped distortion may occur as shown in FIG. 25. As for a bend (that is, a distortion) of the rows of pixels (vertical lines) along the vertical direction of the projected image, it is preferable to perform a correction, in view of improvement of the quality of the projected image.

Therefore, in the image projection device 100, by adding a few circuits, the correction of the distortion in the horizontal scanning direction is realized by the drive control of the two-dimensional deflection section 132.

Firstly, the principle of a method for correcting the distortion in the horizontal scanning direction will be briefly described.

In a case where the distortion in the horizontal scanning direction is corrected by the drive control of the two-dimensional deflection section 132, the voltage of the drive signal for the horizontal scanning is modulated to change the amplitude in accordance with the amount of displacement of the rotation of the two-dimensional deflection section 132 around the a-axis, that is, in accordance with the position of the vertical scanning on the screen SC, in correspondence with the degree of the distortion in the horizontal scanning direction. This control enables the trapezoidal distortion and the bobbin-shaped distortion in the projected image to be freely corrected without causing a reduction in the brightness of the projected image.

In order to realize such a control, it is important that even when the voltage of the resonance driving of the deflecting/scanning mirror 10 in the horizontal scanning direction is dynamically changed, the deflecting/scanning mirror 10 is driven followingly.

Here, a method for correcting the distortion in the horizontal scanning direction will be described with a specific example.

Figure 12:
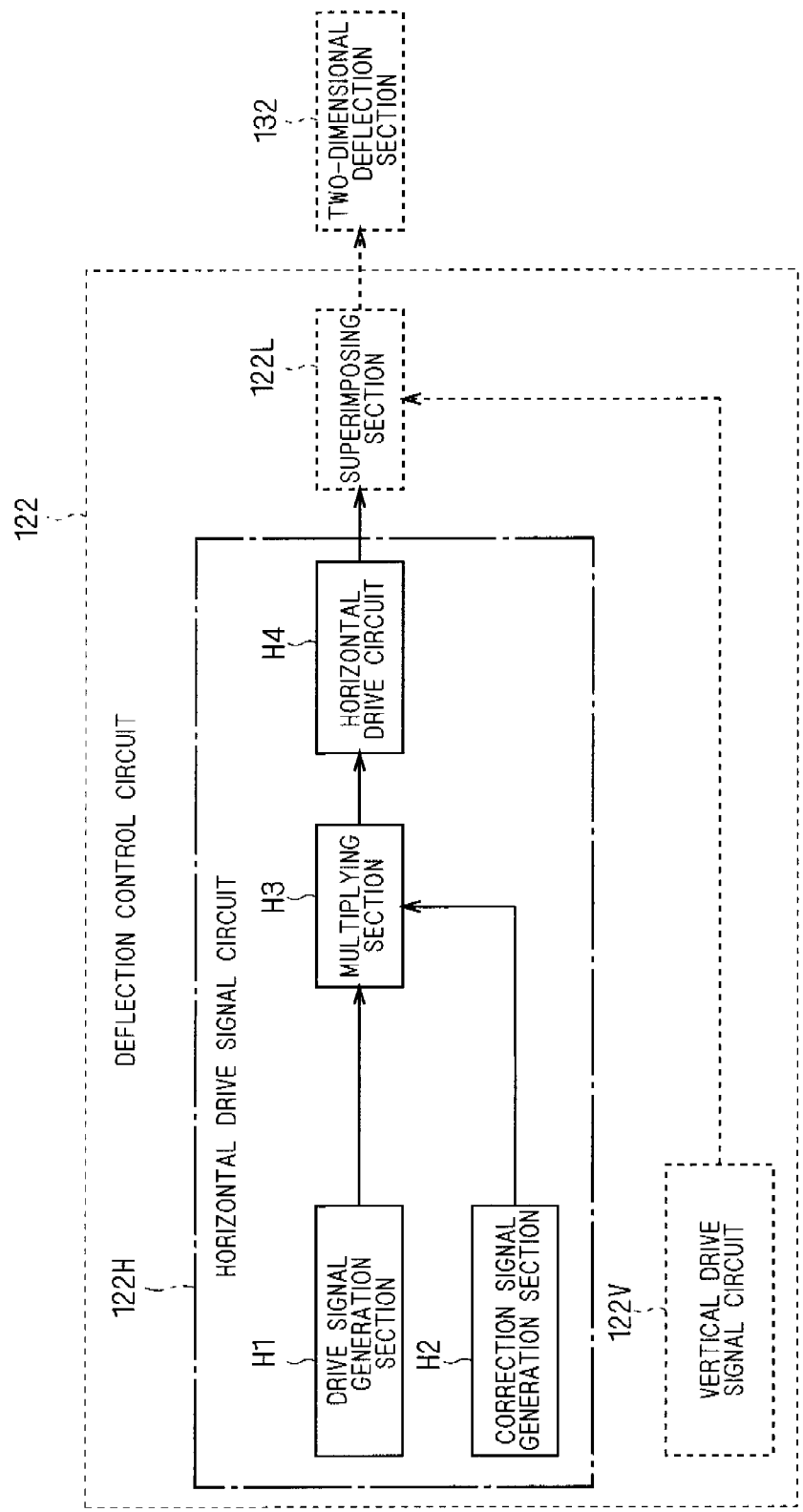
FIG. 12 is a block diagram showing a function configuration of a horizontal drive signal circuit.

FIG. 12 is a block diagram showing a function configuration of the horizontal drive signal circuit 122H which corrects the distortion in the horizontal scanning direction. FIGS. 13A to 13E show waveforms of signals. The horizontal drive signal circuit 122H shown in FIG. 12 is realized as a function included in the deflection control circuit 122. Here, a case where the distortion in the horizontal scanning direction is a so-called trapezoidal distortion is shown as an example. The waveform of the drive signal shown in FIG. 13D exemplifies the one for correcting the so-called trapezoidal distortion.

The horizontal drive signal circuit 122H includes a drive signal generation section H1, a correction signal generation section H2, a multiplying section H3, and a horizontal drive circuit H4.

In order to resonant-drive the deflecting/scanning mirror 10 of the two-dimensional deflection section 132 at a high speed, the drive signal generation section H1 generates a sine-wave drive signal (FIG. 13A) having a constant amplitude and a constant frequency adapted to the mechanical resonance frequency of the deflecting/scanning mirror 10, and outputs the drive signal to the multiplying section H3.

The correction signal generation section H2 generates a correction signal (FIG. 13C) for modulating the voltage of the drive signal for the horizontal scanning, and outputs the correction signal to the multiplying section H3. Since the distortion in the horizontal scanning direction is previously identified in optical designing, a waveform of the correction signal may be set to be a waveform capable of canceling this distortion in the horizontal scanning direction. In the correction signal shown in FIG. 13C, in order to correct the trapezoidal distortion in which the width of an upper portion of the projected image is relatively larger than that of a lower portion thereof, the potential gradually increases in the time period (display time period) in which the image of each frame is projected to and displayed on the screen SC. In the correction signal shown in FIG. 13C, the potential increased in the display time period returns to the original in a so-called blanking interval.

The multiplying section H3 generates a signal (AM wave signal, FIG. 13D) obtained by multiplying the sine-wave drive signal (sine-wave drive signal, FIG. 13A) provided from the drive signal generation section H1 by the correction signal (FIG. 13C) provided from the correction signal generation section H2, and outputs the signal to the horizontal drive circuit H4. In more detail, by the multiplication in the multiplying section H3, the amplitude of the sine-wave drive signal (FIG. 13A) is modulated by the correction signal (FIG. 13C), and a drive signal having a waveform similar to an AM radio wave with a so-called envelope is generated, in which the amplitude of the sine wave gradually increases in the display time period. Thereby, the amplitude of the sine-wave drive signal for repeatedly rotating the deflecting/scanning mirror 10 around the b-axis in the display time period for displaying the image of each frame is strengthened and weakened in accordance with the distortion in the horizontal scanning direction.

The horizontal drive circuit H4 outputs a voltage (or a current) necessary for the rotation around the b-axis to the two-dimensional deflection section 132, in accordance with the AM wave signal (FIG. 13D) provided from the multiplying section H3.

Figure 13A:
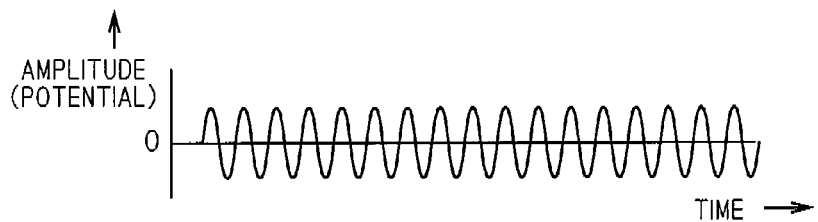
FIGS. 13A to 13E show waveforms of signals for a horizontal scanning.
Figure 13B:
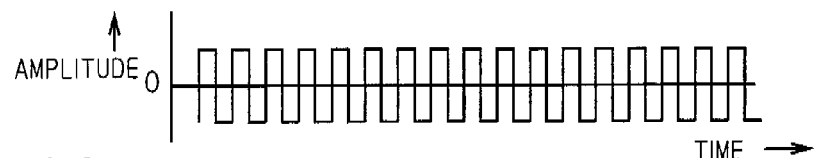
Figure 13C:
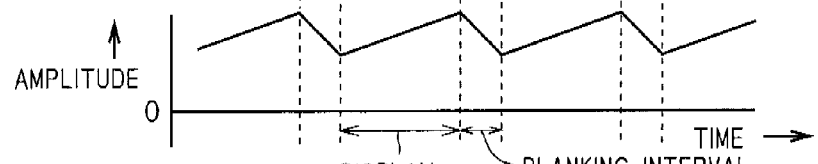
Figure 13D:
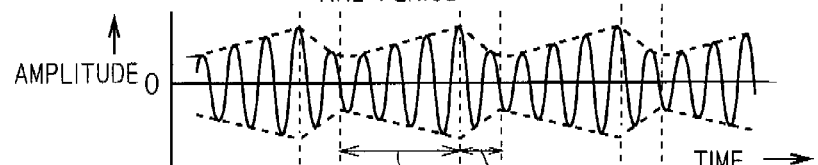

Here, focusing only on the rotation of the deflecting/scanning mirror 10 around the b-axis, for example, the AM wave signal shown in FIG. 13D may be applied, without any change, to the left pair of piezoelectric elements 51, 52 in FIG. 2, and the signal having the phase opposite to the phase of the AM wave signal shown in FIG. 13D may be applied to the right pair of piezoelectric elements 53, 54 in FIG. 2.

However, actually, in the superimposing section 122L, the voltage (or the current) outputted from the horizontal drive circuit H4 is superimposed on a voltage (or a current) which is outputted from the vertical drive signal circuit 122V described above and necessary for the rotation of the two-dimensional deflection section 132 around the a-axis, and then applied to the two-dimensional deflection section 132, that is, to the piezoelectric elements 51 to 54.

Figure 14A:
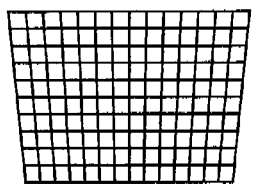
FIGS. 14A and 14B show an embodiment of a distortion correction in a horizontal scanning direction.
Figure 14B:
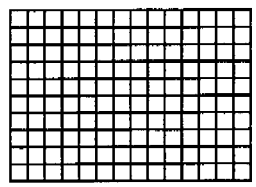

In this manner, the amplitude of the drive signal for rotating the deflecting/scanning mirror 10 around the b-axis is strengthened and weakened. Thus, for example, from the state where the trapezoidal distortion is occurring as shown in FIG. 14A, the width of the horizontal scanning on the screen SC becomes substantially constant as shown in FIG. 14B, so that the distortion in the horizontal scanning direction is corrected. Although the amplitude of the drive signal for rotating the deflecting/scanning mirror 10 around the b-axis is strengthened and weakened by the correction signal, this is not limitative. The drive signal for rotating the deflecting/ scanning mirror 10 around the b-axis may be appropriately strengthened and weakened by computation.

Figure 13E:
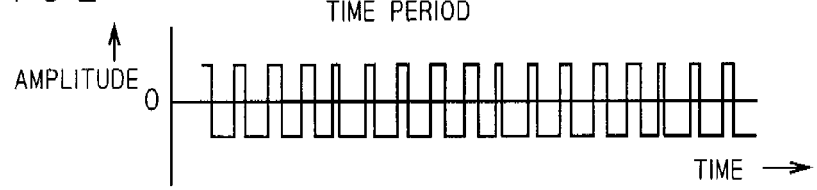

The same effect as obtained by the drive signal (FIG. 13D) with the envelope described above can be obtained also by generating a square wave (pulse wave) as shown in FIG. 13B in the drive signal generation section H1 and performing a modulation so as to change the duty ratio of the square wave as shown in FIG. 13E by using a modulation scheme called PWM (Pulse Width Modulation).

Next, a description will be given of the following of the width of the horizontal scanning after the change of the amplitude of the drive signal including the envelope which is given by the correction signal.

FIG. 15 shows the intensity (amplitude) of a frequency component of the correction signal shown in FIG. 13C. As shown in FIG. 15, a frequency band fc of the correction signal shown in FIG. 13C generally includes frequency components made up of a fundamental wave of the frequency fv of the vertical synchronization signal, and a group of harmonics thereof.

Here, an assumption is made that a correction signal for correcting a particular distortion in the horizontal scanning direction includes frequency components of up to n-times the frequency fv of the fundamental wave, and the deflecting/scanning mirror 10 of the two-dimensional deflection section 132 is driven by a mechanical resonance frequency fom. Under such conditions, a control of the envelope by using the correction signal can be considered as a process of applying to the two-dimensional deflection section 132 the AM wave signal (FIG. 13D) obtained by amplitude-modulating the sine wave drive signal (FIG. 13A) of the resonance frequency by the correction signal (modulation wave signal, FIG. 13C), and obtaining a response thereto, that is, a mechanical vibration to which the envelope is given.

FIG. 16 shows the intensity of the frequency component of the AM wave signal (FIG. 13D). As shown in FIG. 16, the frequency component of the correction signal (FIG. 13C) appears as side bands of the AM wave signal, and more specifically as a frequency band $2fc$ having a width fc at the high frequency side and a width fc at the low frequency side centered at the mechanical resonance frequency fom. The AM wave signal is subjected to filtering of the side bands by mechanical resonance characteristics of the deflecting/scanning mirror 10, that is, the intensity of the frequency component is reduced or eliminated. Therefore, an attempt to simply give an envelope by the correction signal shown in FIG. 13C results in the shape of the envelope in the mechanical vibration losing the sharpness as if the correction signal is passed through a kind of a low pass filter and multiplied. This results in that the effect of the correction of the distortion in the horizontal scanning direction is influenced by the mechanical resonance characteristics in the rotation of the deflecting/scanning mirror 10 around the b-axis (influenced by deformation of the less sharpened envelope in the mechanical vibration). In FIG. 16, the characteristics of the low pass filter, that is, the mechanical resonance characteristics, are indicated by a curve FS1.

Here, as a method for improving the followability of the deflecting/scanning mirror 10 in a case where the amplitude of the drive signal applied to the two-dimensional deflection section 132 is dynamically changed, and more specifically as a method for suppressing the deformation of the envelope in the mechanical vibration, the following methods may be mentioned.

Firstly, for example, there may be mentioned a method in which a filtering process using a band pass filter (BPF) or an amplitude amplification is performed so as to cancel the mechanical resonance characteristics in the rotation of the deflecting/scanning mirror 10 around the b-axis, which is indicated by the curve FS1 of FIG. 16.

As another method for suppressing the deformation of the envelope in the mechanical vibration, also conceivable is a method in which a quality factor Q of the mechanical resonance characteristics in the rotation of the deflecting/scanning mirror 10 around the b-axis is set relatively low. In the following, the method using the quality factor Q will be briefly described.

Generally, the quality factor Q of the resonance characteristics is roughly calculated by the following expression (1), by using the mechanical resonance frequency fom in the rotation of the deflecting/scanning mirror 10 around the b-axis, and a frequency band (−3 dB passing frequency band) fb' in which the reduction in the intensity of the frequency component due to the mechanical resonance characteristics with respect to the resonance frequency fom is within 3 dB.

$$Q \approx fom/fb' \tag{1}$$

Because of a request to preserve the side bands, when the frequency band $2fc$ of the side bands is put in the −3 dB passing frequency band fb', the following expression (2) is satisfied.

$$2fc = fb' \tag{2}$$

Accordingly, based on the aforementioned expressions (1) and (2), the relationship represented by the following expression (3) is established among the mechanical resonance frequency fom of the deflecting/scanning mirror 10 around the b-axis, the quality factor Q, and the frequency band fc of the correction signal.

$$fc \approx fom/(2Q) \tag{3}$$

In a case where the frequency band fc of the correction signal is relatively wide (for example, in a case where a correction of a steep distortion with respect to time is required), the quality factor Q may be reduced to widen the −3 dB passing frequency band fb' based on the aforementioned expression (1), considering that the mechanical resonance frequency fom is substantially determined by the standard of the image signal and therefore the freedom of increase thereof is small.

However, excessively reducing the quality factor Q is no preferable, because the resonant mechanical vibration is easily distorted due to deterioration in the sensitivity in the resonance, a disturbance, and the like. Thus, in such a case, the above-described method using the BPF and the amplification may be used together.

In this manner, by adopting a circuit configuration which increases a resonance band, the driving of the deflecting/scanning mirror 10 can be made follow after the modulation of the amplitude of the drive signal in a good manner.

<(Correction Item IV) Distortion in Vertical Scanning Direction>

The principle of a method for correcting the distortion in the vertical scanning direction will be briefly described. Here, the bend of the horizontal lines shown in FIGS. 7A and 7B is corrected.

In the image processing circuit 112, the image signal is corrected so as not to cause a bend of the horizontal lines of the projected image. In more detail, the image signal is corrected in such a manner that a maximum rectangular region of a region of a projected image which will be generated in a case where the distortion in the vertical scanning direction is not corrected can serve as a projected image, and also in such a manner that the bend of the horizontal lines can be cancelled.

That is, for the correction of the distortion in the vertical scanning direction, a projection region is cut out as disclosed in the Non-Patent Document 1.

The degree of the bend of the horizontal lines occurring in the projected image due to the driving of the two-dimensional deflection section 132 can be previously recognized in designing or by way of experiment. Therefore, the image processing circuit 112 may be set so as to perform the image processing based on a correction coefficient according to the previously recognized distortion in the vertical scanning direction.

When the distortion in the vertical scanning direction is corrected by the image processing in this manner, a load of computation required for the image processing increases, but a high-quality image project can be realized while avoiding the defects such as an increase in the size of the device and an increase in the cost which are caused when the projection optical system is used.

<Summary of Correction Method>

In the image projection device 100 according to the first embodiment, as shown in FIG. 6B, the distortion in the horizontal scanning direction and the uniform speed in the vertical scanning direction are corrected by the drive control of the two-dimensional deflection section 132 (deflection/scanning driving correction). On the other hand, the uniform speed in the horizontal scanning direction and the distortion in the vertical scanning direction are handled by the image correction using the image processing. By these corrections, a high-quality projected image is obtained as described above with FIGS. 7A to 7C. Thus, without using a projection optical system, by the deflection/scanning driving correction and the image correction, the projected image projected to the screen SC can be made high-resolution one having no distortion as shown in FIGS. 7A to 7C.

<Projection Angle Suitable for Distortion Correction in Horizontal Scanning Direction by Deflection/Scanning Driving Correction>

As described above, the horizontal scanning distortion is corrected by the deflection/scanning driving correction. However, if the projection angle θ is excessively large, the quality of the projected image is deteriorated. Therefore, the projection angle θ suitable for correcting the horizontal scanning distortion by the deflection/scanning driving correction will hereinafter be described.

When a trapezoidal distortion (a difference in the width between the upper and lower sides) occurring in the projected image is corrected by the deflection/scanning driving correction, the correction is performed so as to reduce the maximum amplitude of the deflecting/scanning mirror 10. More specifically, the amplitude of the deflecting/scanning mirror 10 in the horizontal scanning is corrected such that the amplitude for a region of the projected image having a large width is matched with the amplitude for a region of the projected image having a small width.

However, when the amplitude of the deflecting/scanning mirror 10 in the horizontal scanning is reduced by the deflection/scanning driving correction, the following phenomenon occurs.

In a case of deflecting and scanning a light flux by using the MEMS mirror 132 in which the size of a surface (deflecting/scanning mirror 10) for reflecting the light flux is limited, the size of a spot formed on the screen SC by a radiated light flux is determined by the size of the deflecting/scanning mirror 10. For example, assuming a case of focusing a light 300 mm in front by the MEMS mirror 132 whose effective diameter (pupil diameter) Φ is 1 mm, an imaging relationship is maintained by making an adjustment such that the spot can be formed at a position on the screen SC. Here, the diameter (spot diameter) D of the spot at that time is obtained by the following expression (4) using a wavelength λ of the laser beam and an f number Fno (=focal length÷pupil diameter).

$$D=1.22 \times Fno \times \lambda \quad (4)$$

Here, assigning 530 nm to the wavelength λ of the aforementioned expression (4), the spot diameter D is obtained as 193 μm (=1.22×(300/1)×0.53 [μm]).

When the rotation angle of the deflecting/scanning mirror 10 in the horizontal scanning is set to be ±5°, the angle (hereinafter also referred to as a "scanning angle") of change in the direction of the light flux around the b-axis of the MEMS mirror 132 for the horizontal scanning due to reflection of the light flux in the deflecting/scanning mirror 10 is ±10° which is twice the rotation angle of the deflecting/scanning mirror 10. Therefore, a projected image of ±53 mm that is, having a width of 106 mm, is produced 300 mm in front of the mirror 132. Dividing the width of this projected image by the spot diameter D results in 549 (≈106/0.193), pixels of 549 dots can be arranged in the horizontal scanning direction of the projected image.

Accordingly, when the size of the deflecting/scanning mirror 10 is constant, the number of dots arranged in the horizontal scanning direction of the projected image depends on the scanning angle. More specifically, the number of dots arranged in the horizontal scanning direction of the projected image becomes greater as the scanning angle increases, and becomes smaller as the scanning angle decreases. Thus, since the scanning angle decreases in the correction of the trapezoidal distortion by the deflection/scanning driving correction, the number of dots arranged in the horizontal scanning direction of the projected image is reduced, which deteriorates the resolution. Even when the width of the projected image in the horizontal scanning direction is made constant by the trapezoidal distortion correction, a deterioration in the image quality is caused if there is a significant difference in the resolution between the upper and lower portions of the projected image.

When the line thickness or the resolution differs by about 20 percent, the difference in the thickness or the resolution can be clearly visually observed by human eyes. Accordingly, when correcting the distortion in the horizontal scanning direction by the deflection/scanning driving correction, in order not to make an image deterioration in the projected image inconspicuous, it is preferable that the following expression (5) is satisfied, in which ΔH represents the maximum value of the percentage of the reduction in the amplitude of the light flux along the horizontal scanning direction on the screen SC.

$$0 < \Delta H < 0.2 \quad (5)$$

For example, in a case where the upper side Xm and the lower side Xs of the projected image satisfy the relationship of the following expression (6) due to the trapezoidal distortion shown in FIG. 24B, a projected image having an inconspicuous image deterioration can be obtained by correcting the distortion in the horizontal scanning direction by the deflection/scanning driving correction.

$$0.8 < Xs/Xm < 1.0 \quad (6)$$

Hereinbefore, the description has been given focusing on correction conditions in the deflection/scanning driving correction of the horizontal scanning distortion for obtaining a projected image having an inconspicuous image deterioration. Hereinafter, on the other hand, a description will be given of conditions of the projection angle θ allowing the horizontal scanning distortion to be corrected by the deflection/scanning driving correction while satisfying the conditions of the aforementioned expression (5).

As described above, in a case where a trapezoidal distortion occurs unless the horizontal scanning distortion is not corrected and additionally the degree of the trapezoidal distortion satisfies the aforesaid expression (6), it is suitable to correct the horizontal scanning distortion by the deflection/scanning driving correction. Accordingly, there is an upper limit value of the projection angle θ suitable for correcting the horizontal scanning distortion by the deflection/scanning driving correction.

In this embodiment, the trapezoidal distortion caused by the oblique projection is corrected. However, when this trapezoidal distortion is small, the correction need not be performed. That is, when no trapezoidal distortion is visually observed by human eyes, it is not necessary to perform the distortion correction in the horizontal scanning direction by the deflection/scanning driving correction. Accordingly, there is a lower limit value of the projection angle θ suitable for correcting the horizontal scanning distortion, that is, correcting the trapezoidal distortion, by the deflection/scanning driving correction.

If the oblique projection is simply performed as shown in FIG. 22, the width of the upper side becomes longer as compared with the width of the lower side as the projection angle θ increases. FIG. 17 shows a relationship between the projection angle θ and a ratio Xs/Xm (=Rs/Rm) of the widths Xm and Xs of the upper and lower sides of the projected image shown in FIGS. 23 and 24. Here, setting is made such that the traveling direction of the lower side forming light flux for forming the lower side of the projected image can be substantially perpendicular to the projection surface, as seen from lateral side. The relationship between the projection angle θ and the Xs/Xm (=Rs/Rm) is obtained in accordance with the following expression (7).

$$(Xs/Xm)=(Rs/Rm)=1/\cos(2\theta) \quad (7)$$

As shown in FIG. 17, even when the projection angle θ is 10°, the value of Xs/Xm (=Rs/Rm) exceeds 1.05. When the trapezoidal distortion exceeds 5%, the distortion is visually observed by human eyes and reaches a noticeable level. Thus, a trapezoidal distortion requiring correction occurs near a point where the projection angle θ exceeds 10°. Even in a case where the lower side forming light flux is not incident substantially perpendicularly to the projection surface and the lower side forming light flux is radiated obliquely to the projection surface in a direction away from the optical axis LP, similarly, the conditions for the trapezoidal distortion to exceed 5% are near the point where the projection angle θ exceeds 10°. That is, the lower limit value of the projection angle θ suitable for correcting the trapezoidal distortion is about 10°.

As described above, it is preferable that the conditions represented by the aforementioned expression (6) are satisfied, in order to correct the horizontal scanning distortion by the deflection/scanning driving correction such that a projected image having an inconspicuous image deterioration can be obtained. In this respect, as shown in FIG. 17, when the projection angle θ is 15°, the trapezoidal distortion is 15%, and a projected image having an inconspicuous image deterioration can be obtained by correcting the trapezoidal distortion only by the deflection/scanning driving correction. On the other hand, when the projection angle θ is 20°, the trapezoidal distortion reaches 31%, and it is difficult to obtain a projected image having an inconspicuous image deterioration by correcting the trapezoidal distortion only by the deflection/scanning driving correction. Thus, the upper limit value of the projection angle θ suitable for correcting the trapezoidal distortion is about 20°.

From the above, the conditions of the projection angle θ allowing the horizontal scanning distortion to be corrected by the deflection/scanning driving correction while satisfying the conditions of the aforementioned expression (5) are the following expression (8).

$$10°<(\text{projection angle }\theta)<20° \quad (8)$$

Precisely calculating in accordance with the aforementioned expression (7), the trapezoidal distortion is about 5% when the projection angle θ is 9°, and the trapezoidal distortion is about 20% when an incident angle is 17%. Therefore, based on the precise calculation, the conditions of the projection angle θ allowing the horizontal scanning distortion to be corrected by the deflection/scanning driving correction while satisfying the conditions of the aforementioned expression (5) are as the following expression (9).

$$9°\leq(\text{projection angle }\theta)\leq16° \quad (9)$$

However, in consideration of an error in computation and an error in human eyes, the conditions of the projection angle θ allowing the horizontal scanning distortion to be corrected by the deflection/scanning driving correction may generally satisfy the aforementioned expression (8).

As described above, in the image projection device 100 according to the first embodiment, under such conditions that an image distortion along the horizontal scanning direction is visually observed, the horizontal scanning distortion is corrected by the control (deflection/scanning driving correction) of the rotation of the deflecting/scanning mirror 10 around the a-axis and the b-axis. Additionally, the uniform speed of the scanning speed of the light flux in the vertical scanning direction is corrected by the deflection/scanning driving correction, so that the scanning speed of the light flux along the vertical scanning direction is kept substantially constant. The uniform speed and the distortion in the horizontal and vertical scanning directions are corrected not by the projection optical system. This enables an image having a high image quality to be projected even in a small-size image projection device.

Second Embodiment

In the image projection device 100 according to the first embodiment, the deflection/scanning driving correction is performed with respect to the uniform speed in the vertical scanning direction and the distortion in the horizontal scanning direction. On the other hand, in an image projection device 100A according to a second embodiment, assuming the application under the conditions that the projection angle θ is about 20° or more, the horizontal scanning distortion is corrected by a combination of the deflection/scanning driving correction and a correction (hereinafter also referred to as an "optical correction") using a projection optical system, and the vertical scanning distortion is also corrected by the optical correction. Hereinafter, the image projection device 100A according to the second embodiment will be described. The image projection device 100A according to the second embodiment has configurations similar to that of the image projection device 100 according to the first embodiment. Thus, the similar configurations are denoted by the same corresponding reference numerals without descriptions thereof, and different configurations will be mainly described.

<Outline Configuration of Image Projection Device>

Figure 18:
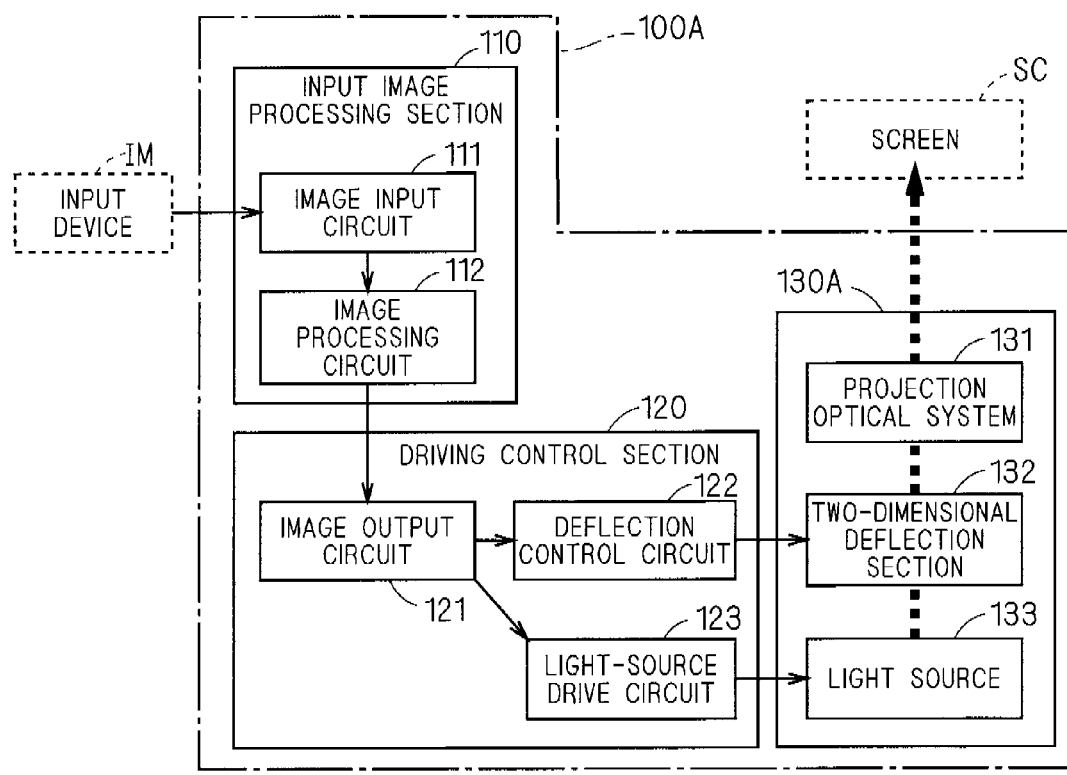
FIG. 18 is a block diagram showing a function configuration of an image projection device according to a second embodiment.

FIG. 18 is a block diagram showing a function configuration of the image projection device 100A according to the second embodiment of the present invention. The image projection device 100A is different from the image projection device 100 according to the first embodiment, in that the optical mechanism section 130 is changed to an optical mechanism section 130A by addition of a projection optical system 131. The other different points are contents of the image processing in the image processing circuit 112, the process in the deflection control circuit 122, and the drive control of the light source 133 by the light-source drive circuit 123, which are along with a change in the method for correcting the distortion in the vertical scanning direction and the horizontal scanning direction. In the following, a description will be given of the point different from the first embodiment, namely, the optical mechanism section 130A and the method for correcting the distortion in the vertical scanning direction and the horizontal scanning direction.

<Outline Configuration of Optical Mechanism Section>

Figures 19, 20:
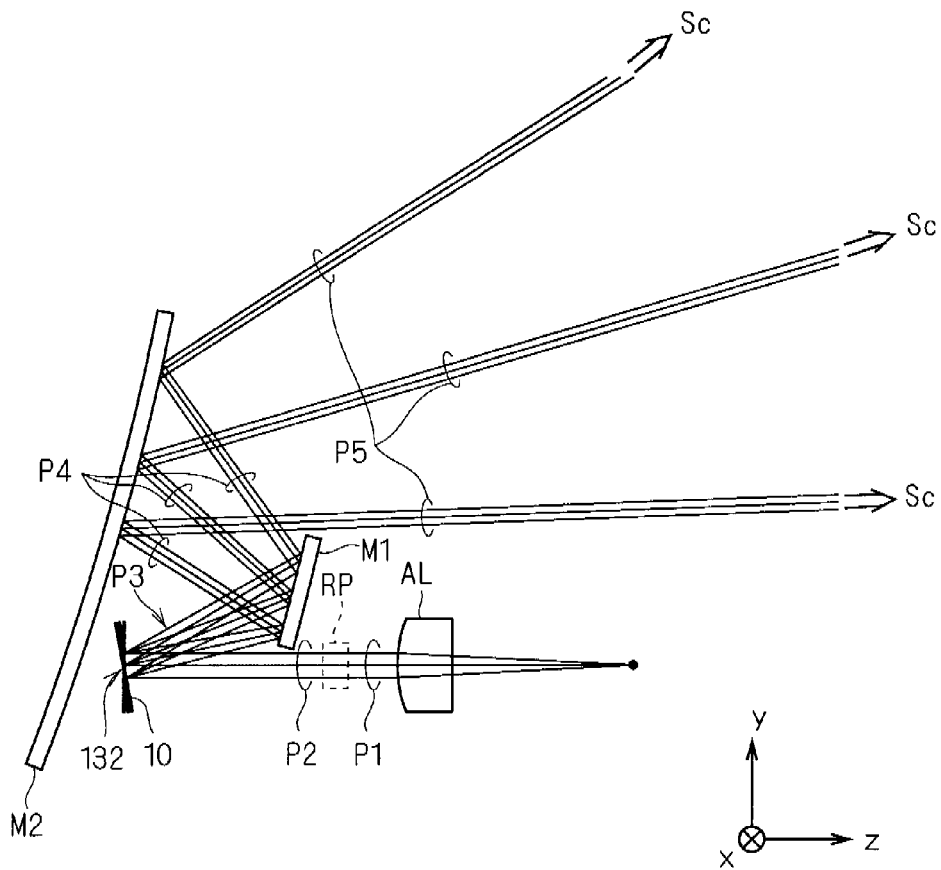
FIG. 19 shows an outline configuration of an optical mechanism section according to the second embodiment.
FIG. 20 collectively shows correction methods.

FIG. 19 shows an outline configuration of the optical mechanism section 130A according to the second embodiment. Similarly to FIG. 4, FIG. 19 schematically shows an optical path of the light flux directed from the light source 133 side toward the screen SC as seen from the lateral side. In FIG. 19, similarly to FIGS. 4 and 5, three orthogonal xyz axes are shown for the purpose of clarifying an orientation relationship. Although FIG. 19 schematically shows the optical path, the optical path at the light source 133 side is actually, at a position near a region RP (region enclosed by a broken line in the drawing), directed toward a direction perpendicular to the drawing sheet by a reflection mirror Mr (which will be described later), as shown in FIG. 5. In this manner, the optical path of the light flux directed from the light source 133 toward the two-dimensional deflection section 132 is the same as that of the first embodiment shown in FIG. 5. Similarly to FIG. 4, FIG. 19 shows optical paths of the light flux deflected at three different angles by the rotation of the deflecting/scanning mirror 10 of the two-dimensional deflection section 132 for the sake of convenience The optical mechanism section 130A is configured with a laser element (not shown) which produces a laser beam of each color, a collimator lens (not shown) for each color, a prism DP, an anamorphic lens AL, the reflection mirror Mr, the two-dimensional deflection section 132, a first projection mirror M1, and a second projection mirror M2, in the mentioned order from the light source 133 side.

In the two-dimensional deflection section 132, the deflecting/scanning mirror 10 appropriately rotate around two axes (a-axis, b-axis), and thereby the light flux P2 is deflected to become a light flux P3 which is then incident on the first projection mirror M1.

The first projection mirror M1 and the second projection mirror M2 form the projection optical system 131. The light flux P3 from the two-dimensional deflection section 132 is reflected by the first projection mirror M1 and its exit direction is changed to result in a light flux P4, and furthermore the light flux P4 is reflected by the second projection mirror M2 and its exit direction is changed to result in a light flux P5 which is then projected to the screen SC.

The two-dimensional deflection section 132, the first projection mirror M1, and the second projection mirror M2 are positioned such that the reflected light fluxes are not blocked. For example, it is impossible that the two-dimensional deflection section 132, the first projection mirror M1, and the second projection mirror M2 are positioned substantially in parallel with the z-axis, because this causes other members to block the light fluxes. Thus, the two-dimensional deflection section 132, the first projection mirror M1, and the second projection mirror M2 are positioned while being misaligned with one another in a direction along the short side of the image and also while the angles thereof are adjusted in accordance with the misalignment. Such a method in which the optical path is shifted each time it is reflected is also called "beam separation".

More specifically, a usual image often has a horizontally long shape with a ratio of lateral:longitudinal=4:3 or lateral:longitudinal=16:9. Shifting the optical path in the direction (long-side direction) along the short side makes the beam separation easier, and is preferable in terms of narrowing down a region where the two-dimensional deflection section 132, the first projection mirror M1, and the second projection mirror M2 are positioned. In other words, it is preferable in terms of downsizing of the projection optical system 131, and thus downsizing of the image projection device 100A.

<Outline of Correction>

FIG. 20 collectively shows correction methods in the image projection device 100A according to the second embodiment.

In the image projection device 100 according to the above-described first embodiment, as shown in FIG. 6B, the deflection/scanning driving correction by the drive control of the two-dimensional deflection section 132 is performed on the uniform speed in the vertical scanning direction and the distortion in the horizontal scanning direction, and the image correction is performed on the uniform speed in the horizontal scanning direction and the distortion in the vertical scanning direction. On the other hand, in the image projection device 100A according to the second embodiment, as shown in FIG. 20, a method for correcting the distortion in the horizontal scanning direction is a combination of the deflection/scanning driving correction and the optical correction, and a method for correcting the distortion in the vertical scanning direction is the optical correction.

FIG. 21 shows correction results of the deflection/scanning driving correction, the optical correction, and the image correction. When, in a case where the projection angle θ is about 20° or more, the oblique projection method is adopted to project a simply rectangular image to the screen SC, as shown in FIG. 21A, a projected image is more largely distorted as compared with the projected image (FIG. 7A) in a case of a relatively smaller projection angle θ. More specifically, the projected image is largely distorted due to the trapezoidal distortion and the variation in the vertical scanning speed, caused by the oblique projection, and the bobbin-shaped distortion and the variation in the horizontal scanning speed caused by the driving of the two-dimensional deflection section 132.

Figure 21A:
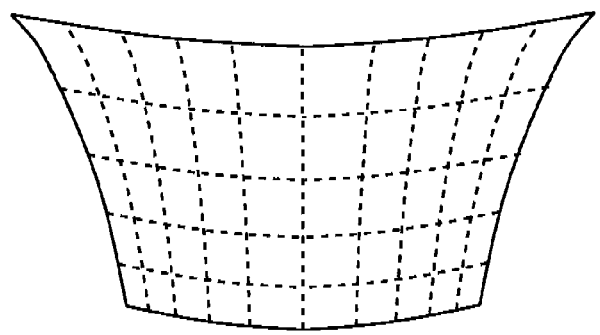
FIGS. 21A to 21D show results of an optical correction, a deflection/scanning driving correction, and an image correction.
Figure 21B:
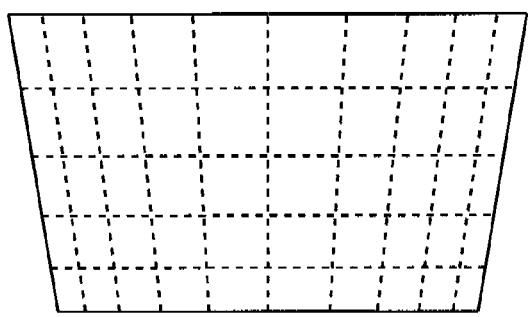
Figure 21C:
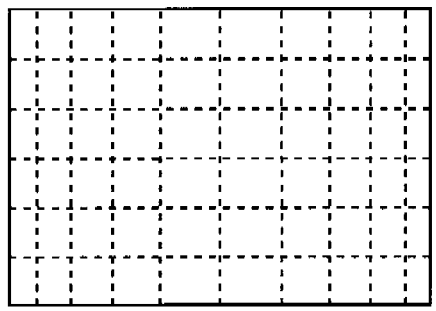
Figure 21D:
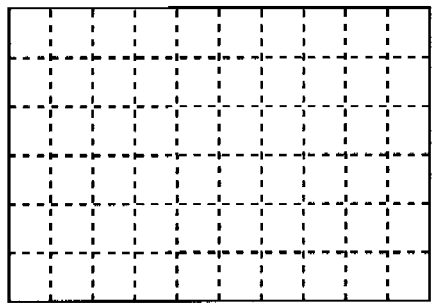

Against such a problem, if a certain percentage of the trapezoidal distortion, the distortion (bend of the vertical line) in the horizontal scanning direction, and the distortion (bend of the horizontal lines) in the vertical scanning direction are corrected by the optical correction, as shown in FIG. 21B, in the projected image, the bends of the vertical lines and the horizontal lines are corrected and the width of the lower side is increased. When the deflection/scanning driving correction is performed on the rest, namely, the trapezoidal distortion and the uniform speed in the vertical scanning direction, the projected image becomes an image in which the rows of pixels (horizontal lines) along the horizontal scanning direction have substantially the same length and intervals of the rows of pixels (horizontal lines) along the horizontal scanning direction are substantially uniform, as shown in FIG. 21C. Furthermore, when the image correction is performed on the uniform speed in the horizontal scanning direction, the projected image becomes an image in which intervals of the rows of pixels along the vertical scanning direction are substantially uniform, as shown in FIG. 21D. That is, a high-quality projected image is obtained.

Here, if the problem of a large distortion of a projected image as shown in FIG. 21A is handled by the image correction, the projected image is reduced to cause the defects such as a deterioration in the resolution, a deterioration in the brightness of the entire screen, and an increase in the load of computation, as described above. Additionally, in the trapezoidal distortion, there is a tendency of an extremely narrowed width of the lower side of the projected image as compared with the width of the upper side. Therefore, if the image correction is simply performed for the purpose of avoiding a deterioration in the resolution and the brightness, the width of the projected image is shortened as compared with the height thereof, and the aspect ratio of the projected image is broken. On the other hand, in the image projection device 200A according to this embodiment, due to the use of the optical correction, when the bends of the vertical lines and the horizontal lines are corrected, an enlargement of the projected image is simultaneously performed so as to increase the width of the lower side of the projected image having a trapezoidal distortion. Therefore, the defects such as a deterioration in the resolution, a deterioration in the brightness of the entire screen, and an increase in the load of computation do not occur, and moreover the aspect ratio of the projected image is maintained. Thus, a high-quality projected image can be obtained.

Next, a description will be given of specific correction methods with respect to, among the above-described four correction items, two correction items which are corrected by different correction methods from those of the first embodiment, namely, the (correction item III) the distortion in the horizontal scanning direction, and the (correction item IV) the distortion in the vertical scanning direction.

<(Correction Item III) Correction of Distortion in Horizontal Scanning Direction>

In the image projection device 200A according to the second embodiment, the correction of the distortion in the horizontal scanning direction is partially handled by the optical correction which performs the correction using the shape of a reflection surface of the projection optical system 131. To perform the optical correction of the distortion in the horizontal scanning direction, it is necessary that a reflection surface (free-form surface) whose optical characteristics (specifically, positive power) differ along a direction corresponding to the horizontal scanning direction is adopted in one or both of the first and second projection mirrors M1, M2. However, in order to increase the scanning angle of the light flux at the lower side of the projected image, one or both of the first and second projection mirrors M1, M2 has or have relatively larger positive power at a lower portion (−y direction) thereof.

As described above, it is necessary to satisfy the aforementioned expression (5), in order to obtain a high-quality projected image by the deflection/scanning driving correction. Therefore, the shape of the reflection surface of the projection optical system 131 needs to be such a shape that the upper side Xm and the lower side Xs of the projected image as a result of the trapezoidal distortion satisfy the relationship of the aforementioned expression (6). The rest of the correction of the distortion in the horizontal scanning direction is partially performed by the deflection/scanning driving correction described in the first embodiment.

In this manner, by performing the distortion correction in the horizontal scanning direction by the combination of the optical correction and the deflection/scanning driving correction, the degree of the bend of the reflection surface of the projection optical system 131 is suppressed as compared with performing the distortion correction in the horizontal scanning direction only by the optical correction. Accordingly, a high-quality projected image can be formed without causing a size increase of the projection optical system 131, that is, a size increase of the image projection device 100A.

<(Correction Item IV) Distortion in Vertical Scanning Direction>

In the image projection device 100A according to this embodiment, by appropriately adjusting the shape of the projection optical system 131, the distortion in the vertical scanning direction is corrected to realize a high-resolution projected image.

In more detail, the distortion of each portion is corrected by using the free-form surface as the shape of the reflection surface of each of the first and second projection mirrors M1, M2 of the projection optical system 131. Adopting the free-form surface as the reflection surface of each of the first and second projection mirrors M1, M2 may be considered to slightly increase the manufacturing cost of the image projection device 100A. However, for example, if the first and second projection mirrors M1, M2 are formed as shaped parts, the manufacturing cost is lowered as compared with a spherical surface part formed by grinding.

Here, conditions required for the projection optical system 131 is that both the uniform speed and the image formation performance are realized in a good manner over the entire region of the projected image. To satisfy the two restrictions of the uniform speed and the image formation performance, if there is no freedom in designing the shape such as if the screen SC has a planar shape, it is preferable that the uniform speed and the image formation performance are adjusted by at least two reflection mirrors. Thus, the image projection device 100A according to this embodiment includes the first and second projection mirrors M1, M2.

As described above, the projection optical system 131 is provided for correcting the horizontal scanning distortion. Therefore, in this embodiment, using this projection optical system 131, the distortion in the vertical scanning direction is corrected by the optical correction. The degree of bend of a curved surface of the projection optical system 131 for correcting the distortion in the vertical scanning direction is difficult to increase, as compared with the degree of curve required for correcting the uniform speed in the horizontal scanning direction.

In a case of the distortion in the vertical scanning direction is corrected by the image correction as in the first embodiment, there is a tendency that the projected image becomes slightly smaller to cause a deterioration in the resolution, a deterioration in the brightness of the entire screen, and an increase in the load of computation. On the other hand, it is preferable that the vertical scanning distortion is corrected by the optical correction as in this embodiment, because the defects such as a deterioration in the resolution, a deterioration in the brightness of the entire screen, and an increase in the load of computation do not occur.

<Specific Example of Optical Configuration Part>

A specific example containing numeral values according to the second embodiment will be shown below (Table 1).

TABLE 1

(A)

| | SURFACE TYPE | RADIUS OF CURVATURE (Y) | CONIC CONSTANT (Y) | MATERIAL | RADIUS OF CURVATURE (X) | CONIC CONSTANT (X) |
|---|---|---|---|---|---|---|
| LIGHT SOURCE | NORMAL | INFINITE | | | | |
| LENS INCIDENCE | NORMAL | INFINITE | 0 | BK7 | | |
| LENS EMIT | XY CURVED SURFACE | −6.568495 | 0 | | −4.8474828 | 0 |
| (PUPIL) | NORMAL | INFINITE | | | | |
| DEFLECTION/ SCANNING MIRROR | NORMAL | INFINITE | | MIRROR | | |
| FIRST PROJECTION MIRROR | FREE-FORM SURFACE | INFINITE | | MIRROR | | |
| SECOND PROJECTION MIRROR | FREE-FORM SURFACE | INFINITE | 0 | MIRROR | | 0 |
| SCREEN | NORMAL | INFINITE | | | | |

(B)

| | X | Y | Z | TILT |
|---|---|---|---|---|
| LIGHT SOURCE | 0 | 0 | −28 | 0 |
| LENS INCIDENT | 0 | 0 | −18 | 0 |
| LENS EXIT | 0 | 0 | −15 | 0 |
| (PUPIL) | 0 | 0 | 0 | 0 |
| DEFLECTION/ SCANNING MIRROR | 0 | 0 | 0 | −8.5 |
| FIRST PROJECTION MIRROR | 0 | −7.398 | −5.429 | 15.17 |
| SECOND PROJECTION MIRROR | 0 | −3.083 | 3.728 | 18.714 |
| SCREEN | 0 | 83.253 | −393.929 | 24.075 |

(C)

| COEFFICIENT | X2Y0 | X0Y2 | X0Y3 | X4Y0 | X2Y2 | X0Y4 | X2Y3 | X0Y5 |
|---|---|---|---|---|---|---|---|---|
| FIRST PROJECTION MIRROR | 7.530E−03 | 1.759E−03 | −2.237E−04 | 3.451E−04 | −1.759E−04 | 3.156E−05 | 6.352E−06 | −8.205E−07 |
| SECOND PROJECTION MIRROR | 3.351E−02 | −7.279E−03 | 1.135E−04 | 2.657E−04 | −1.779E−04 | 3.911E−06 | 4.571E−06 | −5.928E−08 |

(D)

| | | | |
|---|---|---|---|
| H-SCANNING MECHANICAL ANGLE | ±5.73° | USE OF H-DIRECTION TIME | 75% |
| V-SCANNING MECHANICAL ANGLE | ±7.50° | USE OF V-DIRECTION TIME | 80% |

In Table 1 (A), the "light source" is the position at which the laser beam exits from the laser element of each color, and in order therefrom, with respect to the surface (optical surface) of each optical system of the "lens entrance surface" and the "lens exit surface" of the incident optical system (here, the anamorphic lens AL), the "pupil", the "deflecting/scanning mirror 10" of the two-dimensional deflection section 132, the "first projection mirror M1" and the "second projection mirror M2" of the projection optical system 131, and the "screen SC", there are respectively shown the "surface type", the "Y-direction radius of curvature (RADIUS OF CURVATURE (Y) [mm])", the "Y-direction conic constant (CONIC CONSTANT (Y))", the "material", the "X-direction radius of curvature (RADIUS OF CURVATURE (X) [mm])", and the "X-direction conic constant (CONIC CONSTANT (X))".

In Table 1 (B), coordinates of a surface vertex of each optical surface based on the pupil are indicated by a global coordinate system (x, y, z), and the angle (°) of the local coordinate system relative to the X-axis is also indicated with respect to each optical surface.

Table 1 (C) shows data of the free-form surface of each of the first projection mirror M1 and the second projection mirror M2. The free-form surface can be represented by the following expression (10) using a local coordinate system (X, Y, Z) with its origin at the surface vertex.

$$Z = (C0 \cdot H2)/[1+\sqrt{1-(1+K)C0^2 H2}] + \Sigma\{Ajk \cdot X^j Y^k\} \quad (10)$$

Here, Z represents the amount of displacement (based on the surface vertex) in the Z-axis direction at a height of H. H represents the height ($H2=X2+Y2$) in the direction perpendicular to the Z-axis. C0 represents a curvature at the surface vertex. K represents the conic constant. Ajk represents the coefficient of the free-form surface corresponding to the order j of X and the order k of Y. In Table 1(C), for example, X2Y0 represents that the X order j=2 and the Y order k=0. The coefficient Ajk corresponding thereto is $7.530 \times 10^{-3}$ (first projection mirror), $3.351 \times 10^{-2}$ (second projection mirror). The same is true for other coefficients.

Table 1(D) shows a range of the rotation angle of the two-dimensional deflection section 132 in the horizontal scanning direction and the vertical scanning direction, that is, a range of the scanning angle (the H-scanning mechanical angle, the V-scanning mechanical angle) and the time utilization ratio (the H-direction time utilization ratio, the V-direction time utilization ratio).

<Conditions of Projection Angle>

The image projection device 100A according to the second embodiment assumes that the projection angle θ is 20° or more. However, the image projection device 100A is a device which projects a laser, and it should be avoided that a laser beam enters human eyes in order to ensure the security. Therefore, it should be avoided that the projection angle θ excessively increases to cause an oblique projection directed extremely upward. Moreover, if the projection angle θ excessively increases, the trapezoidal distortion becomes too large. Thus, the trapezoidal distortion cannot be completely corrected even by the combination of the optical correction and the deflection/scanning driving correction, and it is difficult to realize a high-quality projected image.

Considering the realization of the security and the high-quality projected image, it is preferable that the projection angle θ is 70° or less. Accordingly, the projection angle θ suitable for the use of the image projection device 100A according to the second embodiment is as represented by the following expression (11).

$$20° < (\text{projection angle } \theta) < 70° \quad (11)$$

As described above, in the image projection device 100A according to the second embodiment, even when the light flux is projected with a certain degree of large inclination relative to the screen SC, the image distortion exceeding 20 percent along the horizontal scanning direction is corrected by the deflection/scanning driving correction and the optical correction. Additionally, the image distortion along the vertical scanning direction is corrected by the optical correction. In such a configuration, a size increase of the image projection device is not caused, as compared with a case where the image distortion along the horizontal scanning direction is corrected only by the optical correction. This enables an image having a high image quality to be projected even in a small-size image projection device.

<Others>

The present invention is not limited to the above-described embodiments. Various modifications, improvements, and the like, may be made without departing from the scope of the present invention.

For example, in the second embodiment, the distortion in the vertical scanning direction is corrected by the optical correction. However, this is not limitative, and it may be corrected by the image correction. In such a configuration, although a deterioration in the resolution and a deterioration in the brightness are slightly caused, the shape of the projection optical system 131 is simplified to realize downsizing of the projection optical system 131, and thus downsizing of the image projection device. Such a configuration has small disadvantages and thus is easy to adopt, as long as the projection angle θ is 20° or more and a relatively small angle.

In the first and second embodiments described above, the uniform speed in the horizontal scanning direction is corrected by the image correction. However, this is not limitative, and it may be corrected by the optical correction. Here, in order to correct the uniform speed in the horizontal scanning direction by the optical correction, a relatively large-size projection optical system is required. Therefore, in terms of downsizing the image projection device, it is preferable to correct the uniform speed in the horizontal scanning direction by the image correction.

In the first and second embodiments, with respect to the vertical scanning direction, the drawing is performed by the scanning along only a single direction. However, this is not limitative. With respect to the vertical scanning direction, the drawing may be performed by using reciprocation of the rotation of the deflecting/scanning mirror 10, similarly to the scanning in the horizontal scanning direction. When such a configuration is adopted, a fundamental waveform of the drive signal for realizing the rotation of the deflecting/scanning mirror 10 in the vertical scanning may be in the shape of a triangular wave, instead of the saw-teeth shape.

In the first and second embodiments, the light source 133 emits the laser beams of three colors R, G, and B. However, this is not limitative. Since it is assumed that the projected image is expressed by the arbitrary number of colors equal to or greater than one, the light source 133 may be one which emits a laser beam of one or more colors. When the projected image is formed by pixels having a constant brightness, it is not necessary to modulate an output in the light source 133.

In the first and second embodiments, in the deflection/scanning driving correction of the horizontal scanning distortion, the envelope is simply given to the waveform of the drive signal. However, this is not limitative. The distortion of the projected image caused by the horizontal scanning distortion is not limited to the so-called trapezoidal distortion, but there are various types such as a bobbin-shaped distortion. Therefore, the amplitude of the drive signal of the sine wave for reciprocating rotation of the deflecting/scanning mirror 10 around the b-axis in the display time period for displaying the image of each frame may be appropriately strengthened and weakened in accordance with the type of the distortion.

In the above-described embodiment, in the two-dimensional deflection section 132, the one deflecting/scanning mirror 10 is rotated around the substantially orthogonal two axes (the a-axis and the b-axis), to thereby perform the deflection in such a manner that the light flux from the light source 133 is two-dimensionally reflected. However, this is not limitative. The deflection may be performed in such a manner that the light flux from the light source 133 is two-dimensionally reflected by realizing the deflection of the light flux along one direction and the deflection of the light flux along another direction by rotations of two reflection parts separately provided. In one of specific examples of this configuration, a first deflection section whose reflection part is rotatable around an a' axis and a second deflection section whose reflection part is rotatable around a b' axis are arranged in sequence in a space in the optical path extending from the light source 133 to the screen SC. However, to realize the horizontal and vertical scanning, it is preferable that: each of the a' axis and the b' axis is set so as to be substantially perpendicular to a line (preferably a central line of the optical path, that is, the center line) within and along the optical path extending from the light source 133 to the screen SC; and the positions of the a' axis and the b' axis are spaced from each other at a predetermined distance along the center line of the optical path for example, and the angular relationship between the a' axis and the b' axis is set to be the relationship in which they are rotated by about 90° around the center line of the optical path. In other words, it is preferable that, based on the a' axis, the b' axis is spaced at a predetermined distance along a predetermined straight line substantially perpendicular to the a' axis, and additionally rotated by substantially 90° around the predetermined straight line.

In the first embodiment described above, it is preferable that the projection angle θ satisfies the conditions of the aforementioned expression (8) in correcting the horizontal scanning distortion by the deflection/scanning driving correction, while in the second embodiment described above, it is preferable that the projection angle θ satisfies the aforementioned expression (11) from the viewpoint of the necessity to provide the projection optical system 131, the security, the quality of the projected image, and the like. Accordingly, comprehensively considering the first and second embodiments, although there is the different of whether the projection optical system 131 is provided or not, it can be considered preferable that, while the distortion in the horizontal scanning direction is corrected by the deflection/scanning driving correction, the projection angle θ satisfies the following expression (12) from the viewpoint of ensuring the security, the quality of the projected image, and the like.

$$10°<(\text{projection angle } \theta)<70° \quad (12)$$

DESCRIPTION OF REFERENCE NUMERALS

| 10 | deflecting/scanning mirror |
|---|---|
| 100, 100A | image projection device |
| 110 | input image processing section |
| 111 | image input circuit |
| 112 | image processing circuit |
| 120 | driving control section |
| 121 | image output circuit |
| 122 | deflection control circuit |
| 122H | horizontal drive signal circuit |
| 122L | superimposing section |
| 122V | vertical drive signal circuit |
| 123 | light-source drive circuit |
| 130, 130A | optical mechanism section |
| 131 | projection optical system |
| 132 | two-dimensional deflection section |
| 133 | light source |
| H1 | drive signal generation section |
| H2 | correction signal generation section |
| H3 | multiplying section |
| H4 | horizontal drive circuit |
| M1 | first reflection mirror |
| M2 | second reflection mirror |
| SC | screen |
| V1 | drive signal generation section |
| V2 | harmonic removal section |
| V3 | correction signal generation section |
| V4 | adding section |
| V5 | vertical drive circuit |

The invention claimed is:

1. An image projection device which projects an image to a projection surface, said image projection device comprising:

a light source section;

a deflection section having a reflection part which reflects a light flux emitted from said light source section, and deflecting said light flux in a two-dimensional direction by rotation of said reflection part around a first axis and rotation of said reflection part around a second axis which is substantially perpendicular to said first axis; and a deflection control section which makes a control for rotating said reflection part around said second axis by resonance driving, and rotating said reflection part around said first axis by non-resonance driving, wherein said deflection control section controls the rotation of said reflection part around said second axis to thereby perform a distortion correction in one direction for suppressing an image distortion along one scanning direction on said projection surface, and controls the rotation of said reflection part around said first axis to thereby perform a speed correction in the other scanning direction for keeping substantially constant a scanning speed of said light flux along the other scanning direction which is substantially perpendicular to said one scanning direction on said projection surface, the relationship of $10°<\theta<70°$ is satisfied, where θ represents an angle of inclination of said light flux, which is projected to said projection surface, toward said other scanning direction, relative to a normal line of said projection surface, in a case where said reflection part is in a central position of the rotations around said first and second axes.

2. The image projection device according to claim 1, further comprising a projection optical system which projects said image to said projection surface by guiding the light flux deflected by said deflection section onto said projection surface, wherein an optical surface forming said projection optical system has a shape for performing a distortion correction in the other scanning direction for suppressing an image distortion along said the other scanning direction on said projection surface, and said distortion correction in one scanning direction, the relationship of $0<\Delta H<0.2$ is satisfied, where ΔH represents a maximum value of the percentage of reduction in the amplitude of scanning of said light flux along said one scanning direction in said distortion correction in one scanning direction performed by said deflection control section, the relationship of $20°<\theta<70°$ is further satisfied.

3. The image projection device according to claim 1, wherein said deflection control section performs said speed correction in the other scanning direction by adjusting a drive signal for rotating said reflection part around said first axis in a display time period for displaying an image of each frame.

4. The image projection device according to claim 1, wherein said deflection control section performs said speed correction in the other scanning direction by adjusting a drive signal for rotating said reflection part around said first axis in a display time period for displaying an image of each frame by using a correction signal.

5. The image projection device according to claim 3, wherein said deflection control section performs said speed correction in the other scanning direction by non-linear adjustment of a waveform of the drive signal for rotating said reflection part around said first axis in a display time period for displaying an image of each frame.

6. The image projection device according to claim 1, wherein
said deflection control section performs said distortion correction in one scanning direction by strengthening and weakening the amplitude of a drive signal for reciprocatingly rotating said reflection part around said second axis in a display time period for displaying an image of each frame.

7. An image projection device which projects an image to a projection surface, said image projection device comprising:
a light source section;
a deflection section having first and second reflection parts which reflect a light flux emitted from said light source section in space sequence, and deflecting said light flux in a two-dimensional direction by rotation of said first reflection part around a first axis and rotation of said second reflection part around a second axis which is, based on said first axis, spaced at a predetermined distance along a predetermined straight line substantially perpendicular to said first axis and which is in a relationship where said first axis is rotated by substantially 90° around said predetermined straight line; and
a deflection control section which makes a control for rotating said second reflection part around said second axis by resonance driving, and rotating said first reflection part around said first axis by non-resonance driving, wherein
said deflection control section controls the rotation of said second reflection part around said second axis to thereby perform a distortion correction in one direction for suppressing an image distortion along one scanning direction on said projection surface, and controls the rotation of said first reflection part around said first axis to thereby perform a speed correction in the other scanning direction for keeping substantially constant a scanning speed of said light flux along the other scanning direction which is substantially perpendicular to said one scanning direction on said projection surface,
the relationship of $10°<\theta<70°$ is satisfied, where $\theta$ represents an angle of inclination of said light flux, which is projected to said projection surface, toward said other scanning direction, relative to a normal line of said projection surface, in a case where said first reflection part is in a central position of the rotation around said first axis and said second reflection part is in a central position of the rotation around said second axis.

8. The image projection device according to claim 7, further comprising a projection optical system which projects said image to said projection surface by guiding the light flux deflected by said deflection section onto said projection surface, wherein
an optical surface forming said projection optical system has a shape for performing a distortion correction in the other scanning direction for suppressing an image distortion along said the other scanning direction on said projection surface, and said distortion correction in one scanning direction,
the relationship of $0<\Delta H<0.2$ is satisfied, where $\Delta H$ represents a maximum value of the percentage of reduction in the amplitude of scanning of said light flux along said one scanning direction in said distortion correction in one scanning direction performed by said deflection control section,
the relationship of $20°<\theta<70°$ is further satisfied.

9. The image projection device according to claim 7, wherein
said deflection control section performs said speed correction in the other scanning direction by adjusting a drive signal for rotating said first reflection part around said first axis in a display time period for displaying an image of each frame.

10. The image projection device according to claim 7, wherein
said deflection control section performs said speed correction in the other scanning direction by adjusting a drive signal for rotating said first reflection part around said first axis in a display time period for displaying an image of each frame by using a correction signal.

11. The image projection device according to claim 9, wherein
said deflection control section performs said speed correction in the other scanning direction by non-linear adjustment of a waveform of the drive signal for rotating said first reflection part around said first axis in a display time period for displaying an image of each frame.

12. The image projection device according to claim 7, wherein
said deflection control section performs said distortion correction in one scanning direction by strengthening and weakening the amplitude of a drive signal for reciprocatingly rotating said second reflection part around said second axis in a display time period for displaying an image of each frame.

* * * * *